US006096836A

United States Patent [19]

Hayase et al.

[11] Patent Number: 6,096,836

[45] Date of Patent: Aug. 1, 2000

[54] (HETERO)AROMATIC ETHER, (THIO) ESTER OR (THIO)CARBONATE EPOXY CATALYST

[75] Inventors: Shuzi Hayase, Yokohama; Yoshihiko Nakano, Tokyo; Shinji Murai, Ichikawa; Yukihiro Mikogami, Yokohama, all of Japan

[73] Assignee: Kabushiki Kaisha Toshiba, Kawasaki, Japan

[21] Appl. No.: 09/035,307

[22] Filed: Mar. 2, 1998

Related U.S. Application Data

[63] Continuation of application No. 08/526,327, Sep. 11, 1995, Pat. No. 5,811,497.

[30] Foreign Application Priority Data

Sep. 16, 1994 [JP] Japan .................................... 6-221326

[51] Int. Cl.[7] .......................... C08G 59/06; C08G 59/24; C08G 59/68

[52] U.S. Cl. .......................... 525/523; 525/480; 525/508; 525/531; 525/533; 528/88; 528/92; 528/271; 528/408; 528/416; 528/418; 558/266; 560/32

[58] Field of Search .................................... 525/480, 508, 525/523, 531, 533; 528/88, 92, 271, 408, 416, 418, 421; 558/266; 560/32

[56] References Cited

U.S. PATENT DOCUMENTS

| | | | |
|---|---|---|---|
| 3,812,214 | 5/1974 | Markovitz . | |
| 4,683,283 | 7/1987 | Goel | 528/93 |
| 4,904,760 | 2/1990 | Gaku et al. | 525/55 |

FOREIGN PATENT DOCUMENTS

| | | |
|---|---|---|
| 504569 | 9/1992 | European Pat. Off. . |
| 52-57245 | 5/1977 | Japan . |
| 57-133120 | 8/1982 | Japan . |
| 59-33335 | 2/1984 | Japan . |
| 63-290737 | 11/1988 | Japan . |
| 63-293049 | 11/1988 | Japan . |
| 2-269731 | 11/1990 | Japan . |
| 3-24116 | 2/1991 | Japan . |
| 6-112606 | 4/1994 | Japan . |

OTHER PUBLICATIONS

Lee and Neville, Handbook of Epoxy Resins, McGraw–Hill, Inc., pp. 1–2, 1967.

Khozin et al., "Antiplasticization of epoxy polymers," Vysolomol. Soedin., Ser. A, vol. 21, No. 8, pp. 1757–1765, 1979.

Morrison and Boyd, Organic Chemistry, Third Edition, Allyn and Bacon, Inc., Boston, MA, pp. 283 and 318, 1973.

*Primary Examiner*—Robert E. Sellers
*Attorney, Agent, or Firm*—Oblon, Spivak, McClelland, Maier & Neustadt, P.C.

[57] ABSTRACT

Disclosed herein is a curing catalyst comprising at least one compound which is a substituted or unsubstituted aromatic or heteroaromatic compound and having any one of groups (I) —O—$R_1$, (II) —O—CY—$R_1$, or (III) —O—CY—X—$R_1$, the groups being directly bonded to the armoatic or heteroaromatic ring, in a number of 1 to 10 wherein $R_1$ may be the same or different and is a substituted or unsubstituted hydrocarbon group having 1 to 20 carbon atoms, X is O or NH and Y is O or S. Furthermore, an epoxy resin composition comprising the curing catalyst is disclosed.

13 Claims, No Drawings

(HETERO)AROMATIC ETHER, (THIO) ESTER OR (THIO)CARBONATE EPOXY CATALYST

This application is a continuation of application Ser. No. 08/526,327, filed on Sep. 11, 1995, now U.S. Pat. No. 5,811,497.

BACKGROUND OF THE INVENTION

1. Field of the Invention

The present invention relates to curing catalysts for use in curing epoxy resins and the like/ and also relates to epoxy resin compositions containing the curing catalysts.

2. Description of the Related Art

Epoxy resin is an excellent thermosetting resin having well-balanced characteristics such as electrical insulating characteristic and mechanical strength. Thus, it has been widely employed in various fields including electrical insulating materials.

The epoxy resin is cured by heating; however, its curing rate is low by nature. To increase the curing rate, various types of catalysts are usually used. Conventionally used as such catalysts are dicyandiamido, $BF_3$ complexes, imidazole derivatives and the like.

When a conventional catalyst is used in an epoxy resin composition, the cure of an epoxy resin gradually proceeds from the time of blending, even at room temperature. In other words, the reaction occurs in the epoxy resin composition as a result of mere storage, resulting in a cured epoxy resin. Therefore, the epoxy resin has a limited term of the storage and must be used within the term.

The curing reaction by using of the conventional catalysts is mediated by an ionic material. Hence, the ionic material remaining in a cured resin after the curing reaction causes a significant deterioration in the electrical insulating characteristics of the resin.

SUMMARY OF THE INVENTION

The object of the present invention is to provide a curing catalyst for use in a resin composition, particularly in an epoxy resin composition, which does not catalyze a curing reaction at about room temperature, but rapidly acts as a catalyst to make the resin cured at a temperature not lower than a predetermined temperature which is higher than room temperature without leaving an ionic substance in the completely cured resin. More specifically, the curing catalyst improves stability-in-storage of the resin composition at about room temperature, whereby the resin composition can be stored for a long period of time, and not causes deterioration in its electrical insulating characteristics.

Another object of the present invention is to provide an epoxy resin composition having an excellent workability and a high stability-in-storage, in which the curing reaction does not take place at about room temperature whereas the rapid reaction takes place at a temperature not lower than a predetermined temperature which is higher than room temperature, and which can afford a cured product having excellent electrical insulating characteristics and mechanical strength.

The curing catalyst of the present invention comprises at least one compound selected from the group consisting of compounds represented by the following formulas (I), (II) and (III) and at least one aluminum compound.

$$A\!-\!(O-R_1)_k \qquad \text{(I)}$$

$$A\!-\!(O-\overset{\displaystyle Y}{\overset{\|}{C}}-R_1)_k \qquad \text{(II)}$$

$$A\!-\!(O-\overset{\displaystyle Y}{\overset{\|}{C}}-X-R_1)_k \qquad \text{(III)}$$

wherein A is a substituted or unsubstituted aromatic group or a heteroaromatic group; $R^1$ may be the same or - different and is a substituted or unsubstituted hydrocarbon group having 1 to 20 carbon atoms; X is O or NH; Y is O or S; and k is an integer from 1 to 10.

The epoxy resin composition of the present invention comprises an epoxy resin and a curing catalyst containing at least one compound selected from the group consisting of compounds represented by the following formulas (I), (II) and (III) and at least one aluminum compound.

$$A\!-\!(O-R_1)_k \qquad \text{(I)}$$

$$A\!-\!(O-\overset{\displaystyle Y}{\overset{\|}{C}}-R_1)_k \qquad \text{(II)}$$

$$A\!-\!(O-\overset{\displaystyle Y}{\overset{\|}{C}}-X-R_1)_k \qquad \text{(III)}$$

wherein A is a substituted or unsubstituted aromatic group or heteroaromatic group; $R_1$ may be the same or different and is a substituted or unsubstituted hydrocarbon group having 1 to 20 carbon atoms; X is O or NH; Y is O or S; and k is an integer from 1 to 10.

In the curing catalyst of the present invention, its catalytic activity is not observed at about room temperature but is expressed by a stimuli such as heat or light. Thus, by blending the curing catalyst into a resin composition, the resin composition can preserve excellent curing characteristics at a temperature not lower than a predetermined temperature which is higher than room temperature and can therefore acquire high stability-in-storage at room temperature. In other words, the resin composition containing the curing catalyst of the present invention is stable for a long period of time without the proceeding of the curing reaction at room temperature and rapidly initiates the curing reaction upon heat application or light radiation.

The epoxy resin composition of the present invention contains the aforementioned curing catalyst of the present invention. Therefore, it can be stored for a long time without initiating the curing reaction at room temperature. On the other hand, it initiates the curing reaction to form a cured product rapidly at a temperature not lower than a predetermined temperature which is higher than room temperature. Furthermore, the epoxy resin composition dose not leave ionic substances after curing, thus the cured product has excellent electric insulating characteristics and mechanical strength.

DETAILED DESCRIPTION OF THE PREFERRED EMBODIMENT

The curing catalyst of the present invention comprises at least one compound selected from the group consisting of the compounds represented by the aforementioned formulas (I), (II) and (III).

In formula (I), (II), or (III), $R_1$ is a substituted or unsubstituted hydrocarbon group having 1 to 20 carbon atoms. In the formulas, a group $R_1$, $CYR_1$ or $CYXR_1$ corresponds to a protecting group which is eliminated therefrom by heat application or a low amount of acid thereby a phenolic hydroxyl group being generated. Examples of such a protecting group include a substituted methyl group, 1-substituted ethyl group, 1-branched alkyl group, alkoxycarbonyl group, acyl group, and cyclic group leaving with acid.

Specific examples of the substituted methyl group mentioned above include methoxymethyl, methylthiomethyl ethoxymethyl, ethylthiomethyl, methoxyethoxymethyl, benzyloxymethyl, benzylthiomethyl, phenacyl, bromophenacyl, methoxyphenacyl, methylthiophenacyl, α-methylphenacyl, cyclopropylmethyl, benzyl, diphenylmethyl, triphenylmethyl, bromobenzyl, nitrobenzyl, methoxybenzyl, methylthiobenzyl, ethoxybenzyl, ethylthiobenzyl, piperonyl, and t-butoxycarbonyl groups.

Examples of the 1-substituted ethyl group mentioned above include 1-methoxyethyl, 1-methylthioethyl, 1,1-dimethoxyethyl, 1-ethoxyethyl, 1-ethylthioethyl, 1,1-diethoxyethyl, 1-phenoxyethyl, 1-phenylthioethyl, 1,1-diphenoxyethyl, 1-benzyloxyethyl, 1-benzylthioethyl, 1-cyclopropylethyl, 1-phenylethyl, and 1,1-diphenylethyl groups.

Examples of the 1-branched alkyl group mentioned above include isopropyl sec-butyl, t-butyl, 1,1-dimethylpropyl, 1-methylbutyl, and 1,1-dimethylbutyl groups.

Examples of the alkoxycarbonyl group mentioned above include methoxycarbonyl, ethoxycarbonyl, isopropoxycarbonyl, and t-butoxycarbonyl groups.

Examples of the acyl group mentioned above include acetyl, propionyl, butyryl, heptanoyl, hexanoyl, valeryl, pivaroyl, isovaleryl, lauryloyl, myristoyl, palmitoyl, stearoyl, oxalyl, malonyl, succinyl, glutaryl, azipoyl, piperoyl, suberoyl, azelaoyl, sebacoyl, acryloyl, propioloyl, methacryloyl, crotonoyl, oleoyl, maleoyl, fumaroyl, mesaconoyl, camphoroyl, benzoyl, phthaloyl, isophthaloyl, terephthaloyl, naphthoyl, toluoyl, hydroatropoyl, atoropoyl, cinnamoyl, furoyl, tenoyl, nicotinoyl, isonicotinoyl, p-toluenesulfonyl, and mesyl groups.

Examples of the aforementioned cyclic group leaving with acid include cyclopropyl, cyclopentyl, cyclohexyl, cyclohexenyl, 4-methoxycyclohexyl, tetrahydropyranyl, tetrahydrofuranyl, tetrahydrothiopyranyl, tetrahydrothiofuranyl, 3-bromotetrahydropyranyl, 4-methoxytetrahydropyranyl, 4-methoxytetrahydrothiopyranyl, S,S-dioxide, 2-1,3-dioxolanyl, 2-1,3-dithioxolanyl, benzo-2-1,3-dioxolanyl, and benzo-2-1,3-dithioxolanyl groups.

Examples of the substituted or unsubstituted aromatic group or heteroaromatic group represented by A in the aforementioned formula (I), (II), or (III), include a phenyl group; a condensed aromatic ring group formed by condensing 2 or 3 benzene rings, such as a naphthyl, anthracenyl, or phenanthrenyl group; a heteroaromatic monocyclic group such as a furanyl, thiophenyl, pyrrolyl, pyrrolinyl, pyrrolidinyl, oxazolyl, isooxazolyl, thiazolyl, isothiazolyl, imidazolyl, imidazolinyl, imidazolidinyl, pyrazolyl, pyrazolydinyl, triazolyl, frazanyl, tetrazolyl, pyranyl, thiinyl, pyridinyl, piperidinyl, oxazinyl, morpholinyl, thiadinyl, pyridadinyl, pyrimidinyl, pyrradinyl, piperadinyl, or triazinyl group; a condenced heteroaromatic ring group such as a benzofuranyl, isobenzofuranyl, benzothiophenyl, indolyl, indolinyl, isoindolyl, benzoxazolyl, benzothiazolyl, indazolyl, imidazolyl, chromenyl, chromanyl, isochromanyl, quinolyl, isoquinolyl, cinnolinyl, phthalazinyl, quinazolinyl, quinoxalinyl, dibenzofuranyl, carbazolyl, xanthenyl, acridinyl, phenanthridinyl, phenanthrolinyl, phenazinyl, phenoxazinyl, thianthrenyl, indolizinyl, quinolizinyl, quinuclidinyl, naphthyridinyl, purinyl, or pteridinyl group; and the aforementioned groups in which one or more hydrogens are substituted by one or more substituents.

Examples of the substituents for the aforementioned substituted aromatic groups or heteroaromatic groups include organic groups having at least one carbon atom. When a plurality of substituents are present, the individual substituents may be the same or different to each other. Specific examples of such substituents include organic groups shown below:

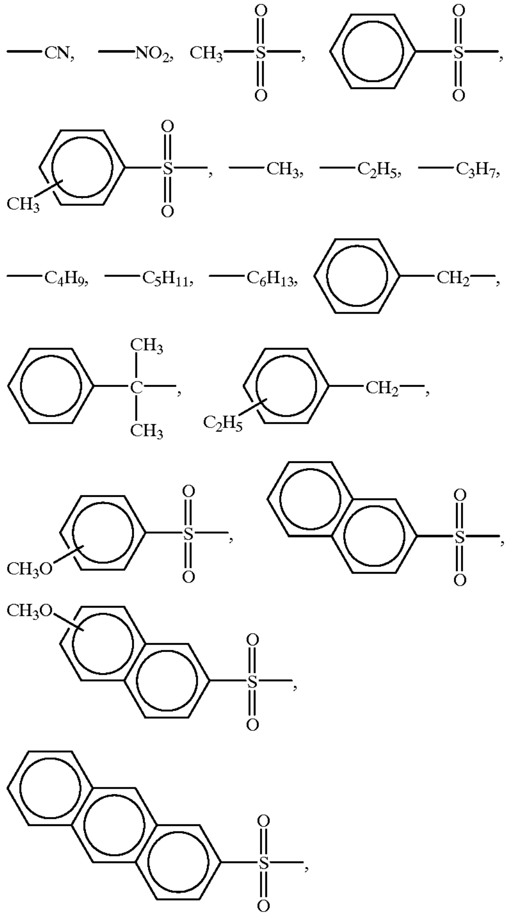

-continued
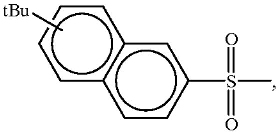
(Bu represents a butyl group)
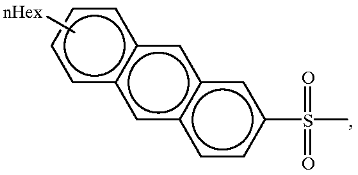
(Hex represents a hexyl group)
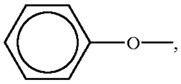
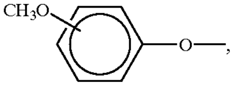
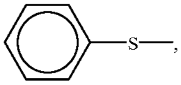
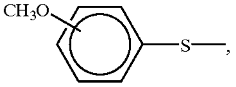
-continued
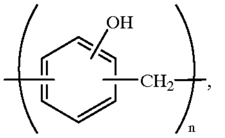
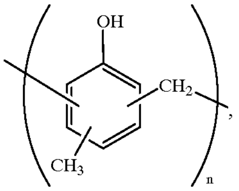
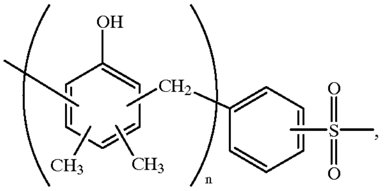
Specific examples of the compound represented by formula (I), (II), or (III) include the compounds shown below:
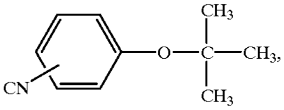
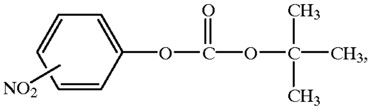
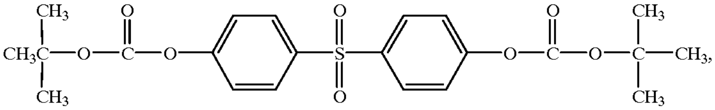
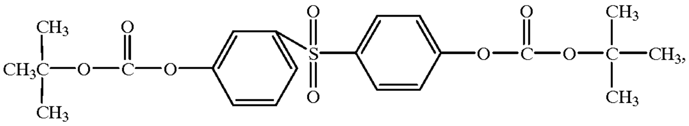
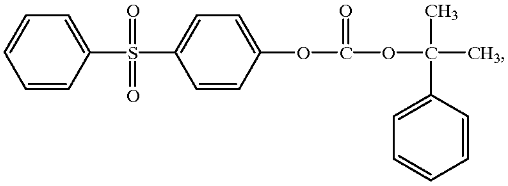
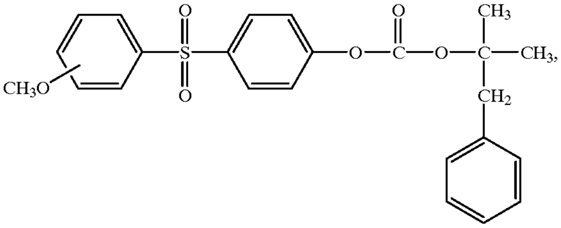

-continued
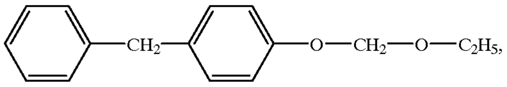
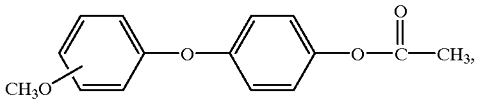
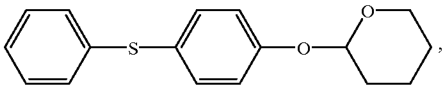
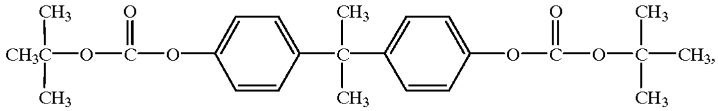
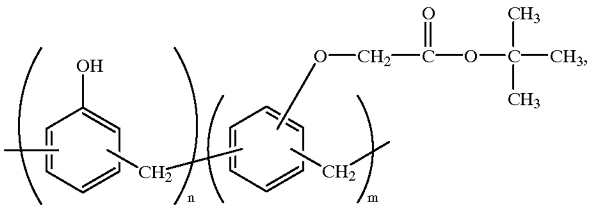
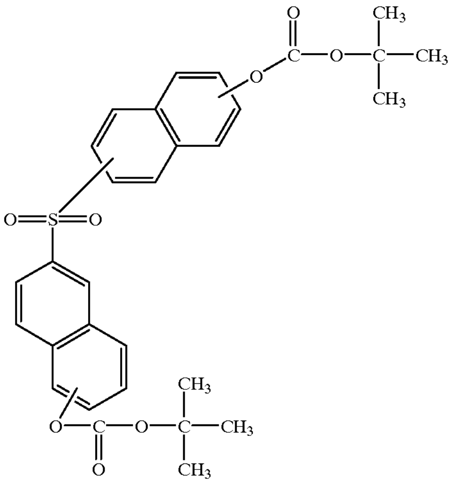
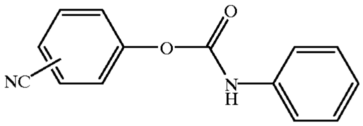
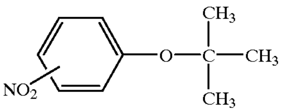
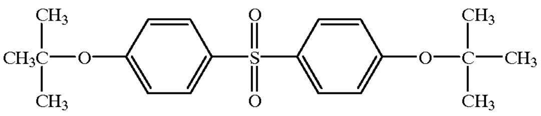
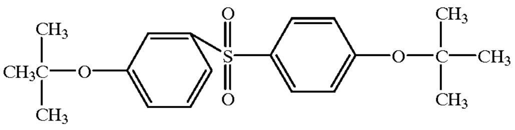

-continued
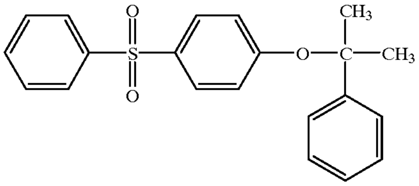
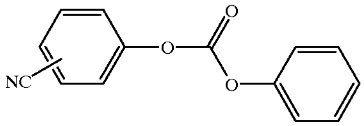
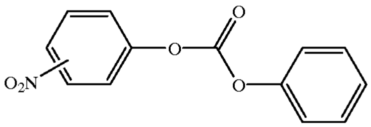
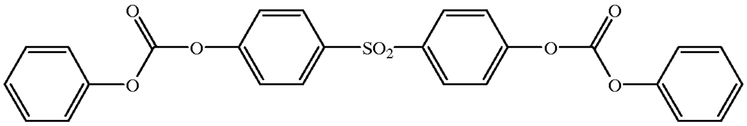
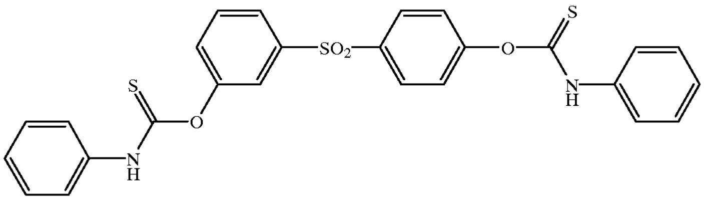
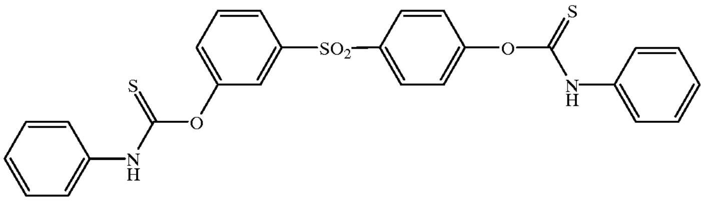
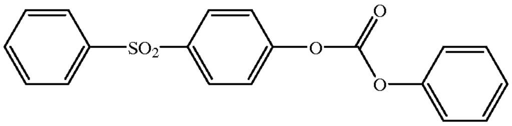
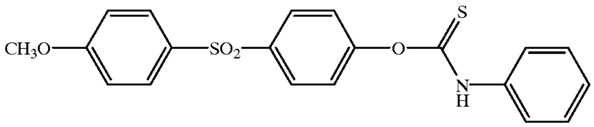
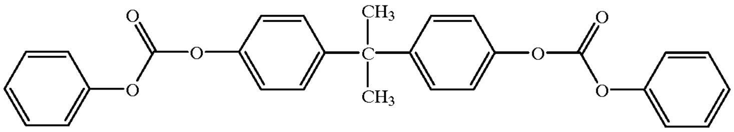
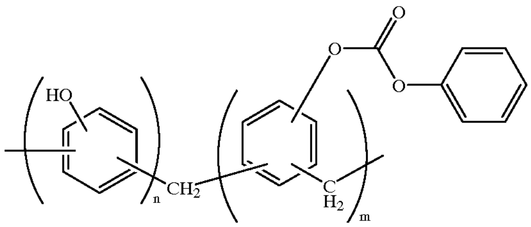

Of the compounds represented by formula (I), a compound having the following structure is excellent in thermolysis, and a curing catalyst containing the compound is advantageous in proceeding the curing reaction rapidly at a temperature not lower than a predetermined temperature which is higher than room temperature:

Ph—O—R' wherein Ph is a substituted or unsubstituted phenyl group; and R' is a —C(Me)R'R''' group or pyranyl group in which Me is a methyl group, R" and R''' may be the same or different and represent a substituted or unsubstituted hydrocarbon group having 1 to 12 carbon atoms.

In particular, when R' is —C(Me)R"R''' groups for example represented by any one of the following structures:

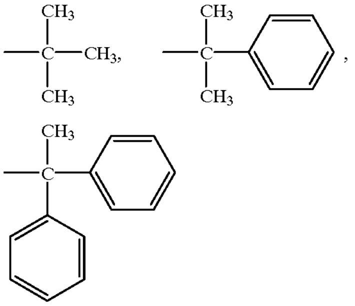

a hydrogen atom of a methyl group is eliminated, as shown in the following equation, to form an isobutene structure:

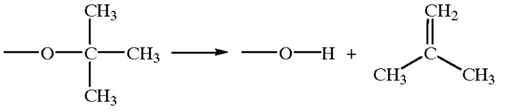

As a result, R' is readily eliminated, accelerating thermolysis.

The curing catalyst containing a compound represented by formula (III) can catalyze a curing reaction by heating with particularly low temperature. Of the compounds represented by formula (III), the compound represented by formula (III) in which X is NH and Y is O, namely the compound having an —O—CO—NH— bond generates isocyanate by thermolysis and the isocyanate thus generated further reacts with a resin such as an epoxy resin. Therefore, the compound represented by formula (III) wherein X is NH and Y is O, rarely leaves the protecting groups solely in a completely cured resin. Hence, the curing catalyst containing this compound provides a cured product having an excellent heat resistance.

On the other hand, the compound represented by formula (III) in which each of both X and Y is O, namely the compound having an —O—CO—O— bond generates a carbon dioxide gas by thermolysis. Thus, a cured product obtained by using a curing catalyst containing the compound is foamed by the carbon dioxide gas generated, and may be expected to have a lowered permittivity.

The compound represented by formula (I), (II), or (III) can be used singly or in the combination of a plurality of compounds arbitrarily chosen.

In the curing catalyst of the present invention, particularly an organic aluminum compound is used as an aluminum compound. Specific examples of the organic aluminum compound include trismethoxyaluminium, trisethoxyaluminium, trisisopropoxyaluminium, trisphenoxyaluminium. trisparamethylphenoxyaluminium, isopropoxydiethoxyaluminium, trisbutoxyaluminium, trisacetoxyaluminium, trisstearatoaluminium, trisbutytoaluminium, trispropionatoaluminium, trisisopropionatoaluminium, trisacetylacetonatoaluminium, tristrifluoroacetylacetonatoaluminium, trishexafluoroacetolacetonatoaluminium, trisethylacetoacetatoaluminium, trissalicylaldehydatoaluminium, trisdiethylmaloratoaluminium, trispropylacetoacetatoaluminium, trisbutylacetoacetatoaluminium, trisdipivaloylmethanatoaluminium, diacetylacetonatodipivaloylmethanatoaluminium, and compounds represented by the following formulas:

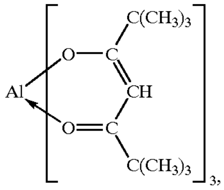

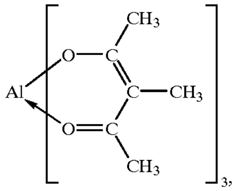

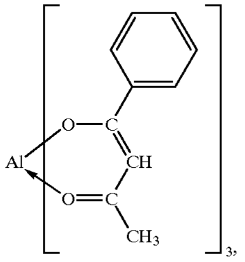

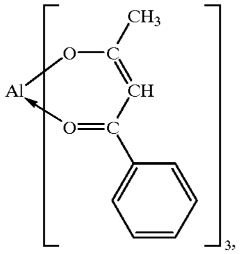

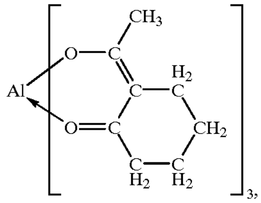

-continued

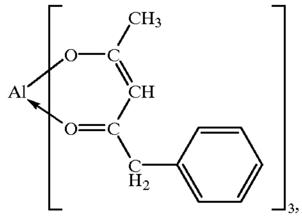

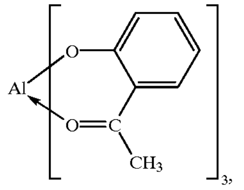

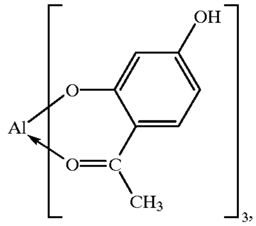

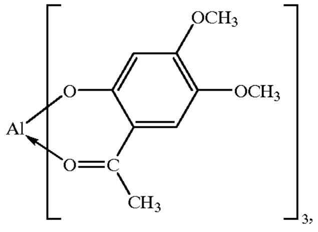

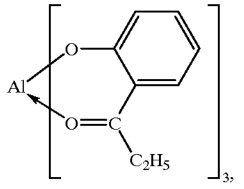

Of the aforementioned compounds, from the economical point of view and taking effects on curing time into consideration, trisacetylacetonato aluminum, trissalicylaldehydatoaluminium and trisethylacetoacetatoaluminium are preferable. Among them, trisethylacetoacetatoaluminium is particularly preferable.

These aluminum compounds can be used in a single form or a combination form of a plurality of compounds arbitrarily chosen.

The mixing ratio of the aluminum compound is preferably 10 parts by weight to 200 parts by weight with respect to 100 parts by weight of the compound represented by the formula (I), (II) or (III). If the ratio resides in outside of this range, the amount of any of components remaining in the cured resin will increase. As the results, a mechanical strength of the cured product tends to lower.

Hereinbelow, the epoxy resin composition of the present invention will be described in detail.

The epoxy resin composition of the present invention comprises an epoxy resin and the aforementioned curing catalyst. The epoxy resin used in the epoxy resin composition of the present invention is not particularly limited. As the epoxy resin, use may be made of, for example, a glycidyl ether type epoxy resin prepared by reaction between a novolak compound and epichlorohydrin; a glycidyl ether type epoxy resin prepared by reaction between epichlorohydrin and a diallylbisphenol compound having allyl groups at the ortho positions relative to each of hydroxyl groups of bisphenol A; and the like. Of these compounds, the epoxy resin prepared by using bisphenol A is preferred for the purpose of maintaining the flexibility of the cured resin. Furthermore, the compound is preferred to have a molecular weight of 300 to 5000 and an epoxy equivalent in the range of 150 to 2500.

As the epoxy resin used in the epoxy resin composition of the present invention, an alicyclic epoxy compound may be used. The alicyclic epoxy compound is defined as a alicyclic compound whose ring is directly epoxylated, for example, an alicyclic compounds represented by the structures shown below:

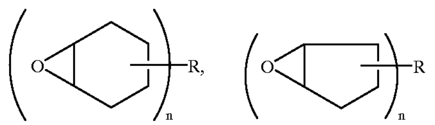

Specific examples of the alicyclic epoxy compounds are as follows:

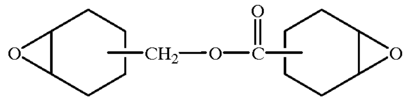

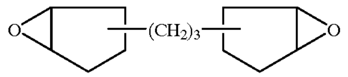

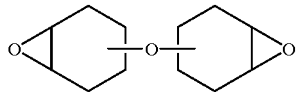

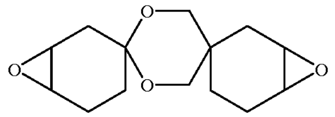

Among the compounds shown above, there is a commercially available compound, for example, Chissonoks 221 (manufactured by Chisso Corporation). The epoxy equivalent of the alicyclic epoxy compound is not particularly limited but an epoxy equivalent of 200 or less is preferable for improving a curing rate.

Furthermore, as the epoxy resin used in the epoxy resin composition of the present invention, use may be made of an epoxy compound having an epoxy group and unsaturated double bond in its molecule. Examples of the epoxy group present in the epoxy compound include groups represented by the following formulas:

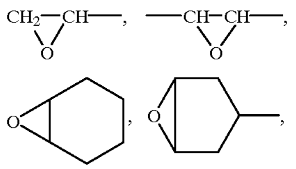

Examples of the group having an unsaturated double bond in the epoxy compound include groups represented by the following formulas:

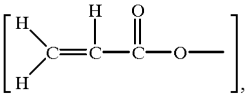

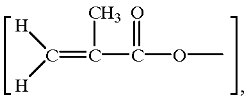

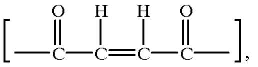

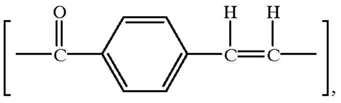

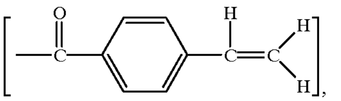

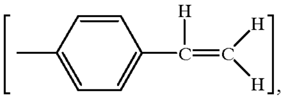

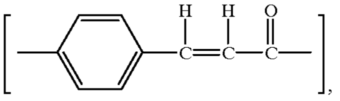

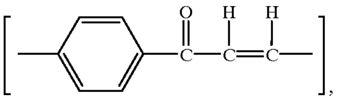

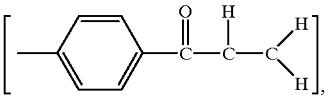

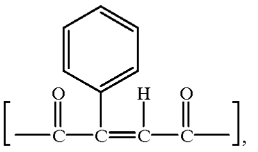

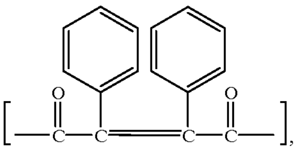

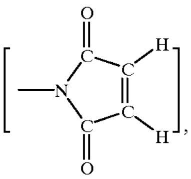

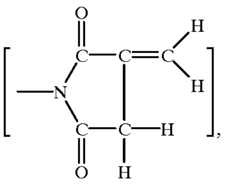

-continued

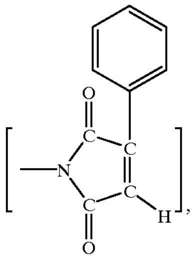

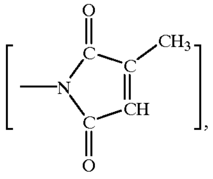

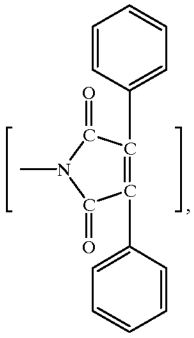

Any number of the epoxy groups and unsaturated double bonds per molecule of the epoxy compound may be present as long as the number is not smaller than 1, and preferably falls within the range of 2 to 5. When a plurality of the groups having an epoxy group or an unsaturated double bond, individual groups may not be necessarily the same and may be present in the form of mixture of two or more types.

In the group having an epoxy group or an unsaturated double bond, the halogen atom bonding to a carbon atom may be substituted with a halogen atom such as a chlorine, bromine, or fluorine atom, or an alkyl group having 1 to 12 carbon atoms, as the case may be. Examples of such an alkyl group include methyl, ethyl, n-propyl, isopropyl, n-butyl, isobutyl, sec-butyl, tert-butyl, n-pentyl, isopentyl, neopentyl, hexyl, heptyl, octyl, nonyl, and dodecyl groups.

In the epoxy compound having an epoxy group and an unsaturated double bond, the structure of the epoxy compound can be arbitrarily selected depending on its usage. The epoxy compound having a desired structure can be obtained, for example, by reacting an unsaturated carboxylic acid with an usual epoxy compound in the presence of a catalyst such as choline chloride in an organic solvent.

Examples of the unsaturated carboxylic acid used in the above-mentioned reaction include acrylic acid, methacrylic acid, cinnamic acid, maleic acid, and derivatives thereof. As the epoxy compound, any epoxy compound can be used as long as it contains at least one epoxy group within the molecule and may be either monofunctional- or polyfunctional-epoxy compound.

Examples of the monofunctional epoxy compound mentioned above include ethyleneoxide, propyleneoxide, butyleneoxide, styleneoxide, phenylglycidylether, and butylglycidylether.

The polyfunctional epoxy compound mentioned above is not particularly limited and any epoxy compound can be used as long as it is generally known as an epoxy resin. Examples of the polyfunctional epoxy compound include a bisphenol A type epoxy resin; a bisphenol F type epoxy resin; a phenol novolak type epoxy resin; an alicyclic epoxy resin; an epoxy resin containing a heterocycle, such as triglycidylisocyanurate or hydantoin epoxy; a hydrogenated bisphenol A type epoxy resin; an aliphatic epoxy resin such as propyleneglycol-diglycidylether or pentaerythritol-polyglycidylether; a glycidylester type epoxy resin obtained by reaction between epichlorohydrin and an aromatic, aliphatic, or alicyclic carboxylic acid; an epoxy resin containing a spiro cycle; a glycidylether type epoxy resin prepared by reaction between epichlorohydrin and an o-allyl-phenolnovolak compound; and a glycidylether type epoxy resin prepared by reaction between epichlorohydrin and a diallylbisphenol compound having allyl groups at the ortho positions relative to each of hydroxyl groups of bisphenol A.

Specific examples of the epoxy compound having an epoxy group and an unsaturated double bond include the compounds shown below:

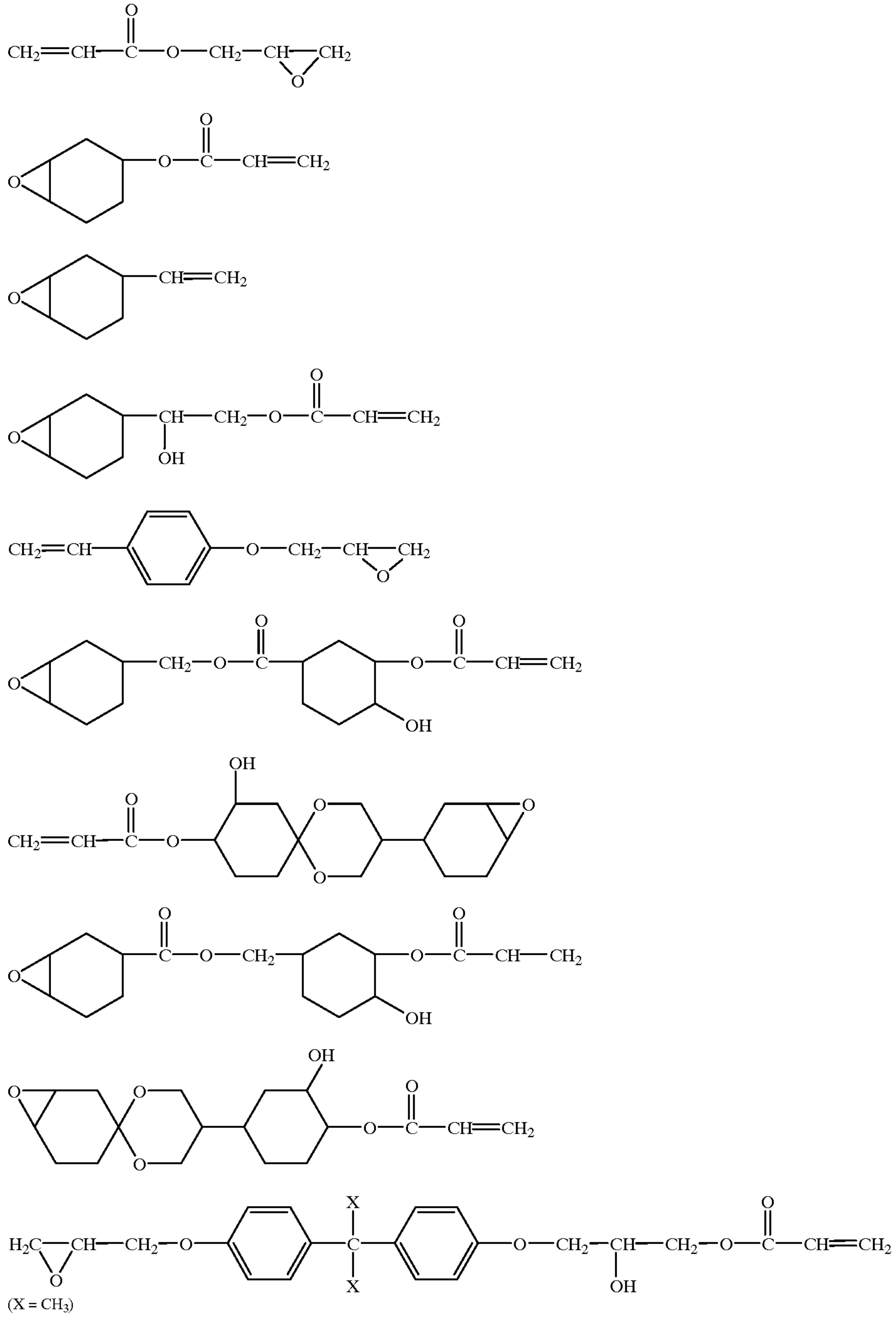

(X = $CH_3$)

-continued

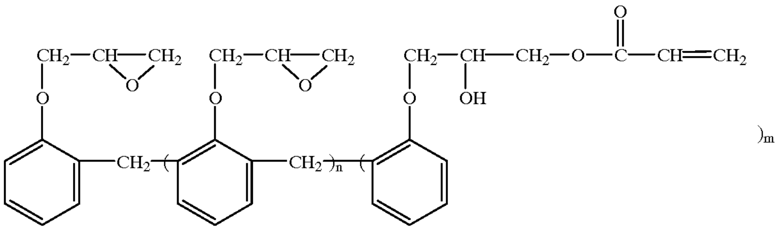

(n is an integer of zero or more,
m is an integer of one or more)

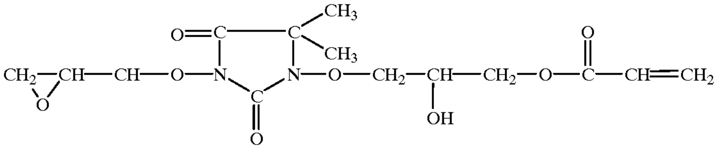

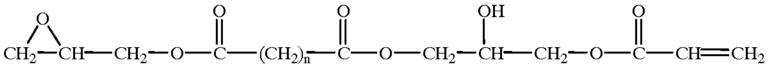

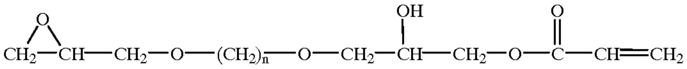

(n is an integer of 2 or more)

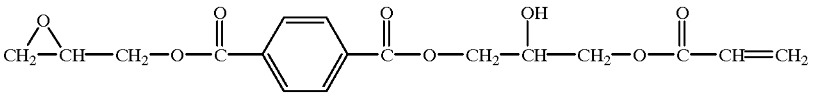

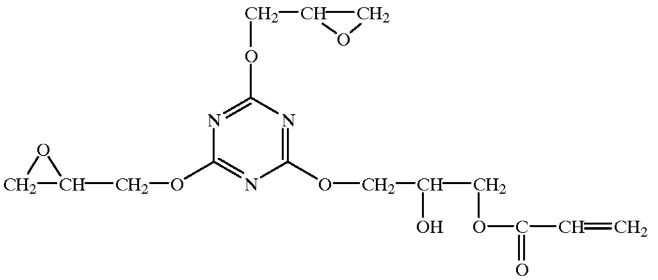

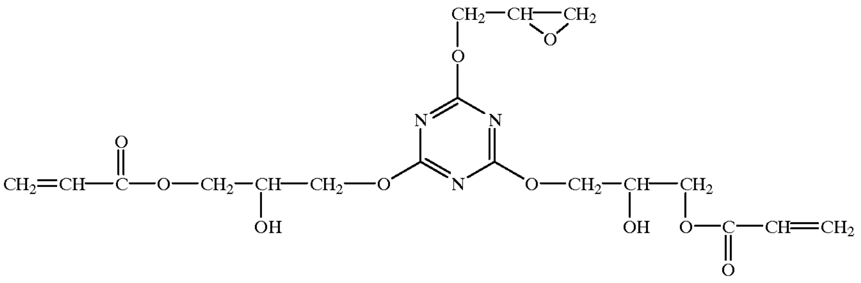

and derivatives thereof in which an acryl group: —$COOCH{=}CH_2$ is converted to a methacryl group: —$COOC(CH_3){=}CH_2$.

In the epoxy resin composition of the present invention, the content of the compound represented by formula (I), (II) or (III) is preferably 0.1 wt % to 50 wt % based on the amount of the resin contained in the resin composition. If the content exceeds 50 wt %, phenol generated by decomposition of the compound will remain in a completely cured resin, with the result that deterioration in the characteristics of the cured resin sometimes occurs. On the other hand, if the content is less than 0.1 wt %, the compound will not fully function as a catalyst, with the result that the mechanical strength of the cured product tends to deteriorate.

On the other hand, the content of the aluminum compound is preferably 0.1% by weight to 5% by weight. If the content is less than 0.1% by weight, the rate of a curing reaction will be low. If the content exceeds 5% by weight, the cost will increase, adversely affecting electrical characteristics.

In the epoxy resin composition of the present invention, an acid anhydride, a phenol, or an aromatic amine compound may be used as a curing agent, together with the epoxy resin mentioned above.

Specific examples of the acid anhydride to be used as a curing agent include phthalic anhydride, hexahydrophthalic anhydride, tetrahydrophtahlic anhydride, methyltetrahydrophthalic anhydride, methylhexahydrophthalic anhydride, nadic anhydride, methylnadic anhydride, chlorendic anhydride, dodecylsuccinic anhydride, methylsuccinic anhydride, benzophenonetetracarboxylic anhydride, pyromellitic anhydride, and maleic anhydride.

The acid anhydride is preferably contained in an amount corresponding to 0.1 to 1.1 times that of the epoxy resin in terms of equivalent. If the equivalent of the acid anhydride exceeds 1.1 times the equivalent of the epoxy resin, an un-reacted acid anhydride will remain in a completely cured resin, possibly causing deterioration in the characteristics of the cured product. On the other hand, if the content of the acid anhydride is less than 0.1 times the equivalent of the epoxy resin, the addition effect of an acid anhydride will not be fully obtained.

Specific examples of a phenol to be used as a curing agent include a phenolic resin, a phenol novolak resin, a cresol novolak resin, and polyvinylphenol.

The phenol is preferably contained in an amount corresponding to 0.1 to 1.1 times that of the expoxy resin in terms of equivalent. If the equivalent of the phenol exceeds 1.1 times the equivalent of the epoxy resin, an unreacted phenol will remain in a completely cured product, possibly causing deterioration in the characteristics of the cured product. On the other hand, if the content of the phenol is less than 0.1 times the equivalent of the epoxy resin, the addition effect of a phenol will not be fully obtained.

Examples of the aromatic amine compound to be used as a curing agent include 4,4'-diaminodicyclohexylmethane, 1,4-diaminocyclohexane, 2,6-diaminopyridine, m-phenylenediamine, p-phenylenediamine, 4,4'-diaminodiphenylmethane, 2,2'-bis(4-aminophenyl)propane, 4,4'-diaminodiphenyloxide, 4,4,-diaminodiphenylsulfone, bis(4-aminophenyl)methylphosphineoxide, bis(4-aminnophenyl)methylamine, 1,5-diaminonaphthalene, m-xylylenediamine, 1,1-bis(p-aminophenyl)phlathane, p-xylylenediamine, hexamethylenediamine, 6,6'-diamino-2, 2'-dipyridyl, 4,4,-diaminobenzophenone, 4,4'-diaminoazobenzene, bis(4-aminophenyl)phenylmethane, 1,1-bis(4-aminophenyl)cyclohexane, 1,1-bis(4-aminophenyl-3-methylphenyl)cyclohexane, 2,5-bis(m-aminophenyl)-1,3,4-oxadiazole, 2,5-bis(p-aminophenyl)-1, 3,4-oxadiazole, 2,5-bis(m-aminophenyl)thiazolo(4,5-d) thiazole, 5,5'-di(m-aminophenyl)-2,2'-bis(1,3,4-oxadiazolyl), 4,4'-diaminodiphenylether, 4,4'-bis(p-aminophenyl)-2,2'-dithiazole, m-bis(4-p-aminophenyl-2-thiazolyl)benzene, 4,4'-diaminobenzanilide, 4,4'-diaminophenylbenzoate, N,N'-bis(4-aminobenzyl)-p-phenylendiamine, 4,4'-methylenebis(2-chloroaniline), 2,2-bis[4-(4-aminophenoxy)phenyl]propane, bis[4-(4-aminophenoxy)phenyl]sulfone, 1,4-bis(4-aminophenoxy) benzene, 1,3-bis(4-aminophenoxy)benzene, and 1,3-bis(3-aminophenoxy)benzene.

The aromatic amine compound is preferably contained in an amount corresponding to 0.1 to 1.1 times that of the epoxy resin in terms of equivalent. If the equivalent of the aromatic amine compound exceeds 1.1 times the equivalent of the epoxy resin, an un-reacted amine compound will remain in a completely cured resin, possibly causing deterioration in the characteristics of the cured product. On the other hand, if the content of the amine compound is less than 0.1 times the equivalent of the epoxy resin, the addition effect of an aromatic amine compound will not be fully obtained.

To the epoxy resin composition of the present invention, further, a compound containing an unsaturated double bond such as a methacrylic resin or an acrylic resin can be arbitrarily blended in accordance with a purpose. For the purpose of increasing mechanical strength at high temperature, a maleimide can be added. Examples of such a maleimide include N, N'-substituted bismaleimide represented by the following formula:

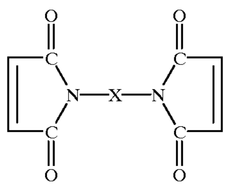

wherein, X is an alkylene group, cycloalkylene group, bivalent hydrocarbon group such as monocyclic- or polycyclic allylene group, or bivalent hydrocarbon group having a bivalent atomic group such as —$CH_2$—, —CO—, —$SO_2$—, or —CONH— bonded thereto; or poly (phenylmethylene)polymaleimide represented by the following formula:

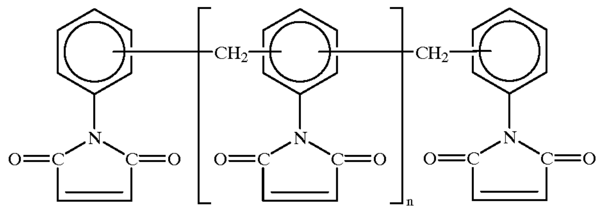

wherein n is an integer from 1 to 5.

Specific examples of the maleimide include N, N'-phenylenebismaleimide, N,N'-hexamethylenebismaleimide, N,N'-diphenylmethanebismaleimide, N,N'-oxy-di-p-phenylenebismaleimide, N,N'-4,4'-benzophenonebismaleimide, N,N'-p-diphenylsulfonebismaleimide, N,N'-(3,3'-dimethyl) methylene-di-p-phenylenebismaleimide, poly (phenylmethylene)polymaleimide, 2,2-bis(4-phenoxyphenyl)propane-N,N'-bismaleimide, bis(4-phenoxyphenyl)sulfone-N,N'-bismaleimide, 1,4-bis(4-phenoxy)benzene-N,N'-bismaleimide, 1,3-bis(4-phenoxy) benzene-N,N'-bismaleimide, and 1,3-bis(3-phenoxy) benzene-N,N'-bismaleimide.

It is preferred that the maleimide be contained in the range of 1 to 70 wt % based on the amount of an epoxy resin. If the content of the maleimide exceeds 70 wt %, the cured product will be fragile and tend to cause deterioration in curing characteristics. On the other hand, if the content is less than 1 wt %, the addition effect of an maleimide will not be fully obtained.

To the epoxy resin composition of the present invention, an inorganic filler can be added in accordance with a purpose. The inorganic filler to be used herein is not particularly limited as long as it can make a complex with a resin. Examples of the inorganic filler include a molten silica, crystalline silica, alumina, silicon nitride, and aluminum nitride.

The inorganic filler is preferably contained in the range of 40 to 90 vol % based on the volume of the entire resin composition. If the content of the inorganic filler is less than 40 vol %, a thermal expansion rate will increase, raising thermal stress to the cured product. On the other hand, if the content exceeds 90 vol %, flowability of the resin composition will show the tendency to decrease.

As previously described, the epoxy resin composition of the present invention contains a curing catalyst containing a compound represented by the aforementioned formula (I), (II), or (III) and an aluminum compound. In the compound represented by formula (I), (II), or (III), as is apparent from the formula, a phenolic hydroxyl group is protected by protecting group. When the epoxy resin composition is cured, it is considered that, at first, the protecting group which protects the phenolic hydroxyl group is decomposed by use of heat, acid, or the like, to thereby generate a phenol group. Subsequently, the phenol group thus generated and the aluminum compound are interacted to polymerize epoxy groups. In the epoxy resin composition of the present invention, since the protecting group cannot be decomposed at about room temperature, the phenolic hydroxyl group is still protected. Accordingly the catalytic activity cannot be expressed and the reaction not proceeds. Once a phenol group is generated by heat or acid, however, the reaction proceeds rapidly. In this sense, the catalytic activity of curing catalyst is latent.

Usually, heat application only is sufficient enough to generate a phenol group through the decomposition of the protecting group of the compound represented by the aforementioned formula (I), (II), or (III). However, in the epoxy resin composition of the present invention, a catalyst capable of generating an acid by heat application or light radiation, can be added in order to assist decomposing the protecting group, provided that the electrical characteristics of the cured resin is not deteriorated.

The compounds serving as an acid generator capable of generating an acid by light radiation, include an onium salt, orthoquinonediazidosulfonic acid chloride, a sulfonate ester, and an organic halide.

Examples of the onium salt include salts having $CF_3SO_3^-$, p—$CH_3PhSO_3^-$, p—$NO_2PhSO_3^-$ (Ph is phenyl) or the like as a counter anion, such as a diazonium salt, phosphonium salt, sulfonium salt; and triarylsulfonium salt, and diarylsulfonium salt. The onium salts mentioned above are known as an acid generator having a good sensitivity to light radiation. Among them, a particularly preferable onium salt is one having a counter anion selected from Lewis bases such as a tetrafluoroborate anion, hexafluoroantimonate anion, hexafluoroarsenate anion, trifluoroacetate anion, trifluoromethanesulfonate anion, and toluenesulfonate anion. Specific examples of the onium salts include trifluoroacetate salts, trifluoromethanesulfonate salts and toluenesulfonate salts of diphenyliodonium, 4,4,-dibutylphenyl, triphenylsulfonium, and t-butyltriphenylsulfonium, and an onium salt having a substituent at a phenyl group thereof.

The organic halide mentioned above is a compound forming a hydrohalogenic acid. Examples of such an organic halide are described in U.S. Pat. Nos.3,515,552, 3,536,489 and 3,779,778, and West German Patent Publication No. 2243621.

Examples of another compounds generating acid by light radiation are disclosed in Jpn. Pat. Appln. KOKAI Publication Nos. 54-74728, 55-24113, 55-77742, 60-3626, 60-138539, 56-17345 and 50-36209.

Specific examples of the compound capable of generating acid by light radiation include di(paratertiarybutylbenzene) diphenyliodonium trifluoro methansulfonate, benzoisotosylate, orthonitrobenzylparatoluenesulfonate, triphenylsulfonium trifluoromethanesulfonate, tri (tertiarybutylphenyl)sulfonium trifluoromethanesulfonate, benzenediazonium paratoluenesulfonate, 4-(di-n-propylamine)-benzonium tetrafluoroborate, 4-p-tolyl-mercapto-2,5-diethoxy-benzenediazonium hexafluorophosphate, tetrafluoroborate, diphenylamine-4-diazonium sulfate, 4-methyl-6-trichloromethyl-2-pyrone, 4-(3,4,5-trimethoxy-styryl)-6-trichloromethyl-2-pyrone, 4-(4-methoxy-styryl)-6-(3,3,3-trichloro-propenyl)-2-pyrone, 2-trichloromethyl-benzimidazole, 2-tribromomethyl-quinoline, 2,4-dimethyl-1-tribromoacetyl-benzene, 4-dibromoacetyl-benzoate, 1,4-bis-dibromomethyl-benzene, tris-dibromomethyl-s-triazine, 2-(6-methoxy-naphth-2-yl)-4,6-bis-trichlomethyl-s-triazine, 2-(naphth-1-yl)-4,6-bis-trichloromethyl-s-triazine, 2-(naphth-2-yl)-4,6-bis-trichloromethyl-s-triazine, 2-(4-ethoxyethyl-naphth-1-yl)-4,6-bis-trichloromethyl-s-triazine, 2-(benzopyran-3-yl)-4,6-bis-trichloromethyl-s-triazine, 2-(4-methoxy-anthracen-1-yl)-4,6-bis-trichloromethyl-s-triazine, 2-(phenanth-9-yl)-4,6-bis-trichloromethyl-s-triazine, and o-naphthoquinonediazide-4-sulfonic acid chloride.

In the epoxy resin composition of the present invention, it is also possible to use a sulfonium salt and an iodonium salt, which are capable of generating acid by heat, other than the aforementioned compound generating acid by light radiation. A sulfonium salt and an iodonium salt, one of whose organic groups being substituted with an alkyl group, aralkyl group, or the like, generate acid by efficiently decomposing.

The acid generator thus mentioned is preferably used in an amount of 10 wt % or less based on the amount of the compound represented by formula (I), (II), or (III). If the amount of the acid generator exceeds 10 wt %, electric insulating characteristics of the cured resin will show a tendency to decrease.

In the epoxy resin composition of the present invention, the compound represented by formula (I), (II), or (III) can be decomposed at lower temperature than ever before by adding an acidic substance such as a carboxylic acid, cresol novolak resin, phenolic resin, or thiol. Furthermore, to decrease a decomposition temperature of the compound represented by formula (I), (II), or (III), use can be made of an organic silicon compound having a hydroxyl group or a hydrolytic group which directly binds to a silicon atom, or a silicon compound generating silanol by light radiation.

The "hydrolytic group" used herein is a residue directly binding to silicon and being hydrolyzed in the presence of water at a certain temperature or more to generate a silanolic hydroxyl group (≡Si—OH). Examples of the hydrolytic group thus mentioned include an alkoxy group having 1 to 5 carbon atoms; an aryloxy group such as a phenoxy, tolyloxy, paramethoxyphenoxy, paranitrophenoxy, benzyloxy, or parachlorophenoxy group; an acyloxy group such as an acetoxy, propionyloxy, butanoyloxy, benzoyloxy, phenylacetoxy, or formyloxy group; an alkenyloxy group having 2 to 12 carbon atoms such as a vinyloxy or allyloxy group; aralkyloxy group such as a benzyloxy or phenethyloxy group; and a group represented by the following formula:

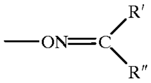

wherein, R' and R" may be the same or different and represent an alkyl group having 1 to 5 carbon atoms.

Examples of the "organic silicon compound having a hydroxyl group or hydrolytic group which directly binds to a silicon atom" mentioned above include organosilane and organosiloxane described hereinbelow.

Organosilane preferably used in the epoxy resin composition of the present invention can be represented by formula (IV):

(IV)

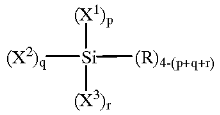

wherein, R is a hydroxyl group or hydrolytic group mentioned above, $X^1$, $X^2$ and $X^3$ may be the same or different and each represents an alkyl group having 1 to 12 carbon atoms; an aryl group such as a phenyl, tolyl, paramethoxyphenyl, parachlorophenyl, paranitrophenyl group; an aralkyl group such as benzyl, phenethyl, paramethoxybenzyl, or paramethylbenzyl group; an alkenyl group such as vinyl, allyl, propenyl, or butenyl group; or an acyl group such as acetyl, benzoyl, or trifluoroacetyl group; p, q, and r, each represents an integer of 0 to 3 and satisfies the relationship: $p+q+r \leqq 3$.

Specific examples of the organosilane mentioned above, which is preferably used in the epoxy resin composition of the present invention include silanols such as diphenylsilanediol, triphenylsilanol, diphenyl(methyl) silanol, phenyl (vinyl)silandiol, tri(paramethoxyphenyl) silanol, triacetylsilanol, diphenyl(ethyl)silanol, diphenyl (propyl)silanol, tri(paranitrophenyl)silanol, phenyldivinylsilanol, 2-butenyldiphenylsilanol, di(2-pentenyl)phenylsilanol, phenyldipropylsilanol, paramethylbenzyldimethylsilanol, triethylsilanol, trimethylsilanol, tripropylsilanol, tributylsilanol, and tri-isobutylsilanol. Specific examples of organosilane having a hydrolytic group include triphenyl(methoxy)silane, diphenyldimethoxysilane, triphenyl(ethoxy)silane, diphenyl (methyl)methoxy silane, phenyl(vinyl)(methyl)(methoxy) silane, diphenyldiethoxysilane, tri(paramethoxyphenyl) methoxysilane, triacetyl(methoxy)silane, diphenyl(ethyl) (ethoxy)silane, diphenyl(propyl)(ethoxy)silane, diphenyl (methyl)(acetoxy)silane, diphenyldipropionyloxysilane, diphenyl(methyl)(triphenylacetoxy)silane, tri (paranitrophenyl)(methoxy)silane, triacetyl(methoxy)silane, phenyldivinyl(propoxy)silane, 2-butenyldiphenyl(methoxy) silane, di(2-pentenyl)(phenyl)(ethoxy)silane, phenyldipropyl(methoxy)silane, tri(paramethoxyphenyl) (ethoxy)silane, paramethylbenzyltrimethoxysilane, trifluoroacetyltrimethoxysilane, di(parachlorophenyl) diethoxysilane, triethyl(methoxy)silane, trimethyl(methoxy) silane, tripropyl(methoxy)silane, tributyl(ethoxy)silane, triisobutyl(acetoxy)silane, and the compounds represented by the following formulas:

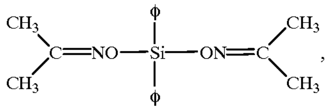

(ϕ is phenyl)

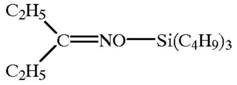

Other than the examples mentioned above, it is a matter of course that an organosilane having both hydroxyl group and hydrolytic group can be used.

The organosiloxane preferably used in the epoxy resin composition of the present invention is a straight (sometimes branched) chain siloxane or cyclo siloxane which comprises a difunctional unit represented by the following formula (V) and/or a trifunctional unit represented by the following formula (VI). As the case may be, the straight chain siloxane or cyclo siloxane may further comprise a quadfunctional unit represented by the following formula (VII). When the siloxane chain of the organosiloxane has an end, the end is blocked with a monofunctional unit represented by the following formula (VIII) and, in particular, at least one of the constitution unit thereof contains either a hydroxyl group or a hydrolytic group.

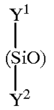

(V)

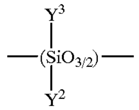

(VI)

(VII)

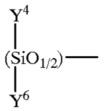

(VIII)

wherein, $Y^1$, $Y^2$, $Y^3$, $Y^4$, $Y^5$, and $Y^6$ may be the same or different and each represents a hydroxyl group or hydrolytic group; an alkyl group having 1 to 12 carbon atoms; an aryl group such as a phenyl, tolyl, paramethoxyphenyl, parachlorophenyl, or paracyanophenyl group; an aralkyl group such as a benzyl, phenethyl, paramethoxybenzyl, or paramethylbenzyl group; an alkenyl group such as a vinyl, allyl, propenyl, or butenyl group; an acyl group such as an acetyl, benzoyl, or trifluoroacetyl group.

An organosiloxane preferably used in the epoxy resin composition of the present invention has a polymerization degree of 50 or less and a hydroxyl group and/or hydrolytic group in an amount of 1000 or less in terms of equivalent, and more preferably has an equivalent of 50 to 500.

Specific examples of preferable organosiloxane having an hydroxyl group mentioned above include 1,3-dihydroxy-1, 3-dimethyl-1,3-diphenyldisiloxane, 1,5-dihydroxy-1,3,5-trimethyl-1,3,5-triphenyltrisiloxane, 1,7-dihydroxy-1,3,5,7-tetramethyl-1,3,5,7-tetraphenyltetrasiloxane, 1,3-dihydroxytetraphenyldisiloxane, 1,5-dihydroxyhexaphenyltrisiloxane, 1,7-dihydroxyoctaphenyltetrasiloxane, 1,5-dihydroxy-3,3-dimethyl-1,1,5,5-tetraphenyltrisiloxane, 1,3-dihydroxytetra(dimethylphenyl)disiloxane, 1,5-dihydroxyhexaethyltrisiloxane, 1,7-dihydroxyoctapropyltetrasiloxane, 1,3, 5-trihydroxy-3-ethyl-1,1,5,5-tetramethyltrisiloxane, 1,5-dihydroxy-1,1,5,5-tetraphenyl-3,3-di-p-tolyltrisiloxane, and the compounds represented by the following formulas:

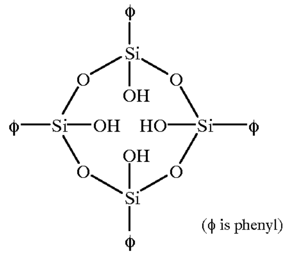

(φ is phenyl)

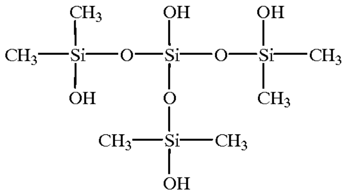

Further, a silicone resin available under a trade name of SH6018 (methylphenylpolysiloxane having a molecular weight of 1600 and hydroxyl groups in an amount of 400 in terms of equivalent, manufactured by Toray Silicone) can be used.

A polysiloxane usually represented by the following formula can also be used.

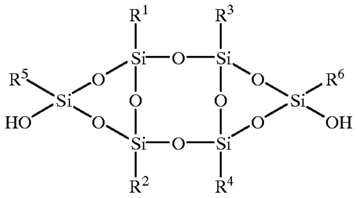

An organic silicon compound having a hydroxyl group or hydrolytic group directly binding to a silicon atom is contained in the range of 0.1 to 50 wt %, preferable 0.5 to 5 wt % based on the amount of the epoxy resin present in the resin composition. If the content is less than 0.1 wt %, it will be difficult to sufficiently lower a decomposition temperature of a compound represented by the formula (I), (II) or (III). It is possible but not preferable to use an organic silicon compound in an amount exceeding 50 wt % by the reason that problems will be arisen due to the elevation of cost and decomposed product(s) of a catalytic component.

As the silicon compound generating a silanol by light radiation and may being used in the epoxy resin composition of the present invention, a silicon compound having any one of a peroxysilano, o-nitrobenzyloxy, or α-ketosilyl group.

The silicon compound having the peroxysilano group mentioned above can be represented by the following formula:

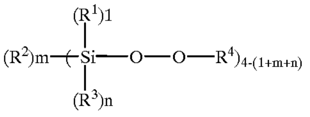

wherein $R^1$, $R^2$, $R^3$, and $R^4$ may be the same or different and each represents a hydrogen atom, a halogen atom, an alkyl group having 1 to 5 carbon atoms, an alkoxy group having 1 to 5 carbon atoms, an aryl group or an aralkyl group; l, m and n, each represents an integer from 0 to 3 and satisfies the following relationship: $1 \leqq l+m+n \leqq 3$.

In the aforementioned formula, as the halogen atom, an chlorine atom or bromine atom can be used. Examples of the alkyl group having 1 to 5 carbon atoms include methyl, ethyl, n-propyl, isopropyl, n-butyl, isobutyl, sec-butyl, tert-butyl, n-pentyl, isopentyl and neopentyl groups. Examples of the alkoxy group having 1 to 5 carbon atoms include methoxy, ethoxy, n-propoxy, n-butoxy, sec-butoxy, tert-butoxy and n-pentyloxy groups. Examples of the aryl group include phenyl, naphthyl and anthranyl groups. Examples of the aralkyl group include benzyl and phenethyl groups. It should be noted that the aforementioned groups may have a substituent such as a halogen atom, a nitro group, a cyano group, or an alkoxy group.

Specific examples of the silicon compound having a peroxysilano group include compounds represented by the peroxysilano group include compounds represented by the following formulas:

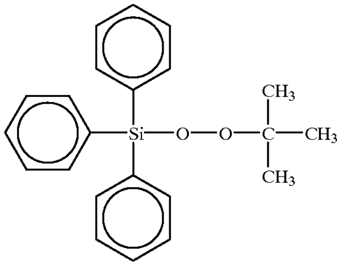

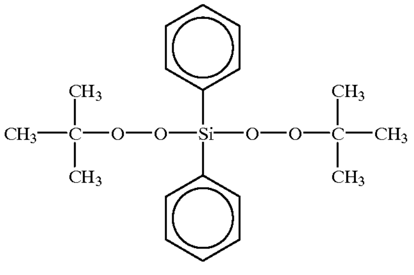

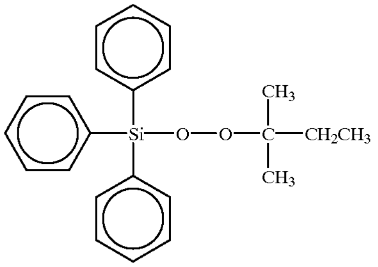

-continued

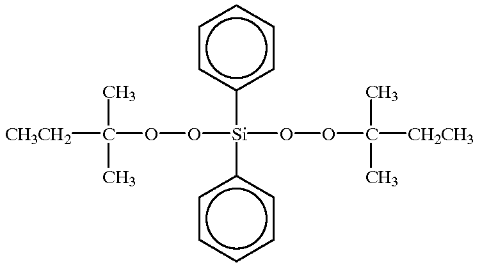

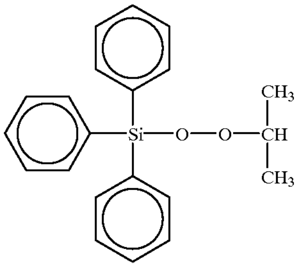

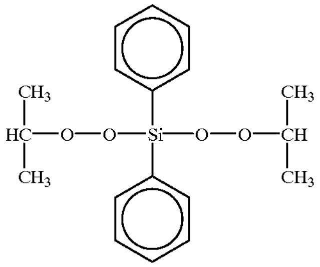

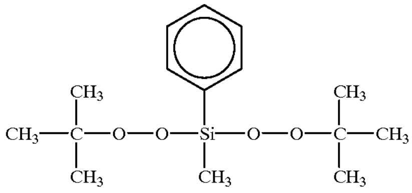

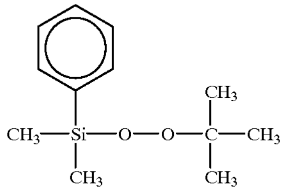

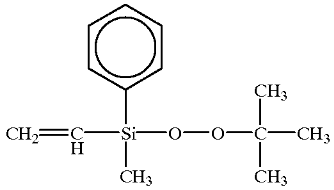

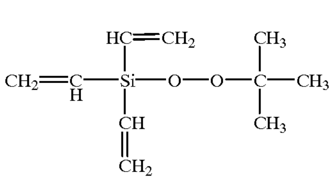

-continued

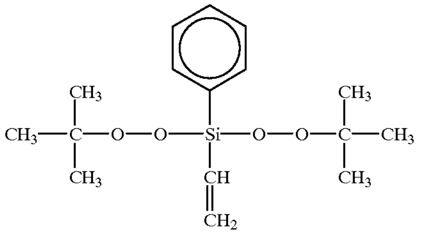

The silicon compound having an o-nitrobenzyloxy group mentioned above can be represented by the following formula:

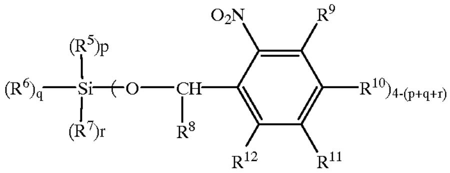

wherein $R^5$, $R^6$ and $R^7$ may be the same or different and each represents a hydrogen atom, a halogen atom, a vinyl group, an allyl group, a substituted or unsubstituted alkyl group having 1 to 10 carbon atoms, an alkoxy group having 1 to 10 carbon atoms, a substituted or unsubstituted aryl, aryloxy, or siloxy group; $R^8$ is an hydrogen atom, a substituted or unsubstituted alkyl group having 1 to 10 carbon atoms, a phenyl group or a substituted phenyl group; $R^9$, $R^{10}$, $R^{11}$ and $R^{12}$ may be the same or different and each represents a hydrogen atom, a nitro group, a cyano group, a hydroxyl group, a mercapto group, a halogen atom, an acetyl group, an allyl group, an alkyl group having 1 to 5 carbon atoms, an alkoxy group having 1 to 5 carbon atoms, a substituted or unsubstituted aryl or an aryloxy group; p, q and r, each represents an integer from 0 to 3 and satisfies the following relationship: $0 \leqq p+q+r \leqq 3$.

In the aforementioned formula, examples of the halogen atom include chlorine and bromine atom. Example of the substituted or unsubstituted alkyl group having 1 to 10 carbon atoms (or 1 to 5 carbon atoms) include methyl, ethyl, n-propyl, n-butyl, tert-butyl, n-pentyl, chloromethyl, chloroethyl, fluoromethyl and cyanomethyl groups. Examples of the alkoxy group having 1 to 10 carbon atoms (or 1 to 5 carbon atoms) include methoxy, ethoxy, n-propoxy and n-buthoxy groups. Examples of the substituted or unsubstituted aryl group include phenyl, p-methoxyphenyl, p-chlorophenyl and p-trifluoromethylphenyl groups. As the aryloxy group, a phenoxy group can be mentioned.

The silicon compound having an o-nitrobenzyloxy group may be a compound having an o-nitrobenzyloxy group as an end group and having a main chain represented by the following formula:

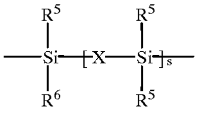

wherein, s is an integer of 1 or more; $R^5$ and $R^6$ may be the same or different and each represents a hydrogen atom, a halogen atom, a vinyl group, an allyl group, a substituted or unsubstituted alkyl group having 1 to 10 carbon atoms, an alkoxy group having 1 to 10 carbon atoms, a substituted or unsubstituted aryl, an aryloxy group, or a siloxy group; X represents an oxygen atom, an alkylene group or an aryldyl group.

Specific examples of the silicon compound having an o-nitrobenzyloxy group include trimethyl(o-nitrobenzyloxy) silane, dimethylphenyl(o-nitrobenzyloxy)silane, diphenylmethyl(o-nitrobenzyloxy)silane, triphenyl(o-nitrobenzyloxy)silane, vinylmethylphenyl(o-nitrobenzyloxy)silane, t-butylmethylphenyl(o-nitrobenzyloxy)silane, triethyl(o-nitrobenzyloxy)silane, tri (2-chloroethyl)-o-nitrobenzyloxy)silane, tri(p-trifluoromethylphenyl-o-nitrobenzyloxy)silane, trimethyl [α-(o-nitrophenyl)-o-nitrobenzyloxy]silane, dimethylphenyl[α-(o-nitrophenyl)-o-nitrobenzyloxy]silane, methylphenyldi[α-(o-nitrophenyl)-o-nitrobenzyloxy]silane, triphenyl(α-ethyl-o-nitrobenzyloxy)silane, trimethyl(3-methyl-2-nitrobenzyloxy)silane, dimethylphenyl(3,4,5-trimethoxy-2-nitrobenzyloxy)silane, triphenyl(4,5,6-trimethoxy-2-nitrobenzyloxy)silane, diphenylmethyl(5-methyl-4-methoxy-2-nitrobenzyloxy)silane, triphenyl(4,5-dimethyl-2-nitrobenzyloxy)silane, vinylmethylphenyl(4,5-dichloro-2-nitrobenzyloxy)silane, triphenyl(2,6-dinitrobenzyloxy)silane, diphenylmethyl(2,4-dinitrobenzyloxy)silane, triphenyl(3-methoxy-2-nitrobenzyloxy)silane, vinylmethylphenyl(3,4-dimethoxy-2-nitrobenzyloxy)silane, dimethyldi(o-nitrobenzyloxy) silane, methylphenyldi(o-nitrobenzyloxy)silane, vinylpenyldi(o-nitrobenzyloxy)silane, t-butylphenyldi(o-nitrobenzyloxy)silane, diethyldi(o-nitrobenzyloxy)silane, 2-chloroethylphenyldi(o-nitrobenzyloxy)silane, diphenyldi (o-nitrobenzyloxy)silane, diphenyldi(3-methoxy-2-nitrobenzyloxy)silane, diphenyldi(3,4-dimethoxy-2-nitrobenzyloxy)silane, diphenyldi(2,6-dinitrobenzyloxy) silane, diphenyldi(2,4-dinitrobenzyloxy)silane, methyltri(o-nitrobenzyloxy)silane, phenyltri(o-nitrobenzyloxy)silane, p-bis(o-nitrobenzyloxydimethylsilyl)benzene 1,1,3,3,-tetraphenyl-1,3-di(o-nitrobenzyloxy)disiloxane, 1,1,3,3,5,5-hexaphenyl-1,5-di(o-nitrobenzyloxy)trisiloxane, and a silicon compound obtained by reaction between silicone resin containing SiCl and an o-nitrobenzyl alcohol.

The silicon compound having an α-ketosilyl group mentioned above can be represented by the following formula:

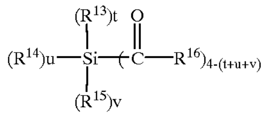

wherein, $R^{13}$, $R^{14}$, $R^{15}$ and $R^{16}$ may be the same or different and each represents a hydrogen atom, a vinyl group, an allyl group, an alkyl group having 1 to 10 carbon atoms, an alkoxy group having 1 to 10 carbon atoms, an aryl group, or an aryloxy group; t, u and v, each represents an integer of 0 to 3 and satisfies the relationship: $1 \leqq t+u+v \leqq 3$.

In the aforementioned formula, examples of the alkyl group having 1 to 10 carbon atoms include methyl, ethyl, n-propyl, n-butyl, tert-butyl, n-pentyl, neopentyl, n-hexyl, n-heptyl and n-octyl groups. Examples of the alkoxy group having 1 to 10 carbon atoms include methoxy, ethoxy, n-propoxy, n-buthoxy, tert-buthoxy, n-pentyloxy, neopentyloxy, n-hexyloxy, n-heptyloxy, and n-octyloxy groups. Examples of the aryl group include phenyl and naphthyl groups. Examples of the aryloxy group include phenoxy and naphthyloxy groups. It should be noted that the aforementioned group may have a substituent such as a halogen atom, a nitro group, a cyano group or a methoxy group.

Specific examples of the silicon compound having an a-ketosilyl group mentioned above include the compounds represented by the following formulas:

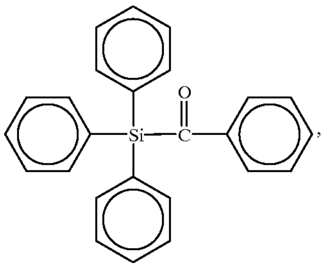

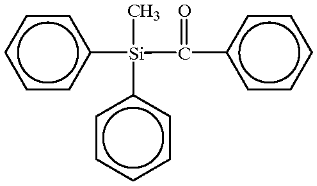

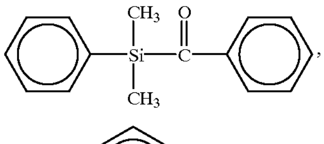

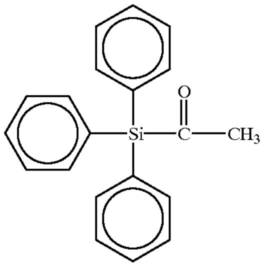

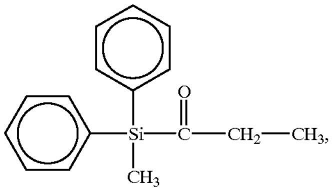

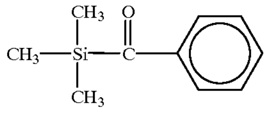

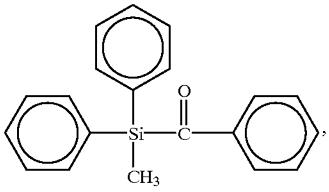

The silicon compound generating a silanol by light radiation may be used singly or in the form of mixture of two or more types. The content of the silicon compound is generally 0.1 to 20 wt %, preferably 1 to 10 wt % based on the amount of the epoxy resin contained in the epoxy resin composition. If the content is less than 0.1 wt %, it will be difficult to sufficiently lower a decomposition temperature of a compound represented by the formula (I), (II) or (III). On the other hand, it is possible but not preferable to use the silicon compound in an amount exceeding 20 wt % by the reason that problems will be arisen due to the elevation of cost and decomposed product(s) of a catalytic component.

In the epoxy resin of the present invention, the curing reaction can be further promoted by using a photosensitizer in addition to the aforementioned compound capable of generating an acid or an acidic substance by light radiation. Any photosensitizer may be used as long as it can sensitize the aforementioned compounds with light and it is appropriately selected depending upon types of compounds to be used, light sources and the like. To describe more specifically, examples of the photosensitizer used herein include an aromatic hydrocarbon and derivatives thereof, benzophenone and derivatives thereof, o-benzoyl benzoate ester and derivatives thereof, acetophenone and derivatives thereof, benzoin, benzoin ether and derivatives thereof, xanthone and derivatives thereof, thioxanthone and derivatives thereof, disulfide compounds, quinone compounds, compounds containing a hydrocarbon halide, and amines.

Specific examples of the aromatic hydrocarbon and derivatives thereof include benzene, benzene-$d_6$, toluene, p-xylene, fluorobenzene, chlorobenzene, bromobenzene, iodobenzene, naphthalene, 1-methylnaphthalene, 2-methylnaphthalene, 1-fluoronaphthalene, 1-chloronaphthalene, 2-chloronaphthanene, 1-bromonaphthalene, 2-bromonaphthalene, 1-iodonaphthalene, 2-iodonaphthalene, 1-naphthol, 2-naphthol, biphenyl, fluolene, p-terphenyl, acenaphthene, p-quaterphenyl, triphenylene, phenathrene, azulene, fluoranthene, chrysene, pyrene, 1,2-benzpyrene, anthracene, 1,2-benzanthracene, 9,10-dichloroanthracene, 9,10-dibromoanthracene, 9,10-diphenylanthracene, perylene, tetracene, and pentacene.

Examples of the benzophenone and derivatives thereof include benzophenone, 2,4-dimethylbenzophenone, 2,4-dichlorobenzophenone, and 4,4'-bis(dimethylamino) benzophenone.

Examples of the o-benzoyl benzoate ester and derivatives thereof include o-benzoyl benzoic acid methyl ester, o-benzoyl benzoic acid ethyl ester, o-benzoyl benzoic acid phenyl ester and compounds represented by the following formulas:

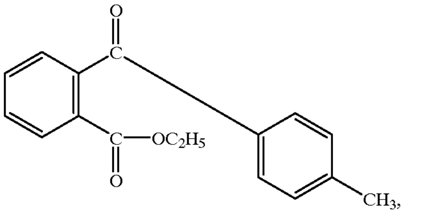

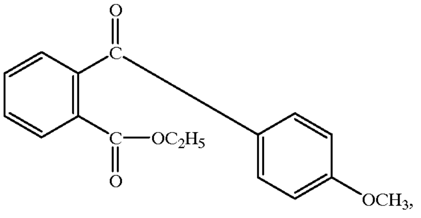

-continued

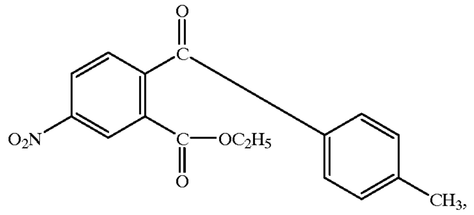

Examples of the acetophenone and derivatives thereof include acetophenone, 4-methylacetophenone, 3-methylacetophenone, and 3-methoxyacetophenone.

Examples of benzoin, benzoin ether and derivatives thereof include benzoin, benzoin methyl ether, benzoin ethyl ether, benzoin isopropyl ether, benzoin n-butyl ether, benzoin triphenyl silyl ether, and a compound represented by the following formula:

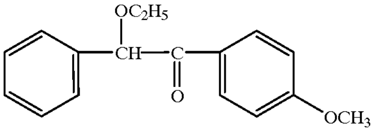

Examples of xanthone and derivatives thereof include xanthone, 2,4-dimethylxanthone, and 2,4-dichloroxanthone.

Examples of thioxanthone and derivatives thereof include thioxanthone, 2,4-dimethylthioxanthone, and 2,4-dichlorothioxanthone.

Examples of the disulfide compound include compounds represented by the following formulas:

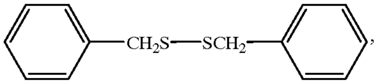

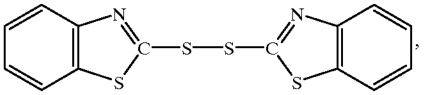

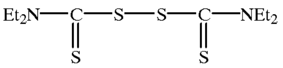

wherein, Et is an ethyl group and hereinafter similarly defined.

Examples of the quinone compounds include benzoquinone, naphthoquinone, anthraquinone, 5,12-naphthacenedione and 2,7-pyrenedione.

Examples of the compound containing a hydrocarbon halide include carbon tetrachloride, hexachloroethane, carbon tetrabromide, and compounds represented by the following formulas.

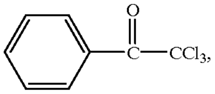

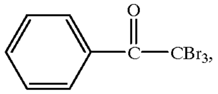

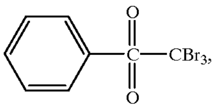

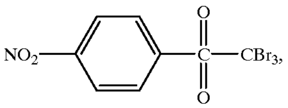

-continued

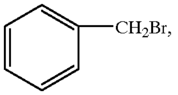

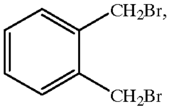

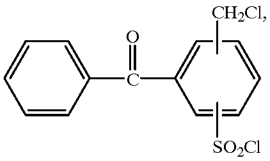

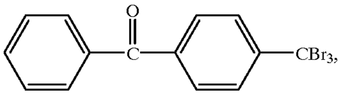

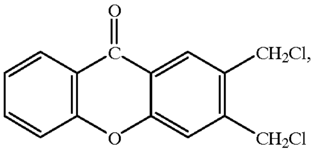

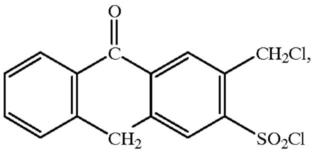

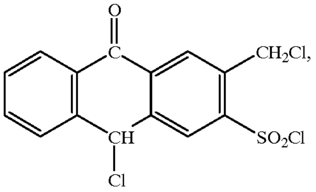

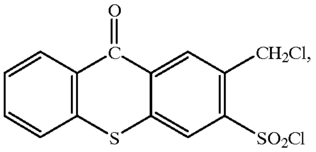

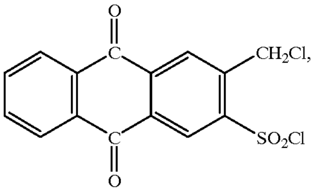

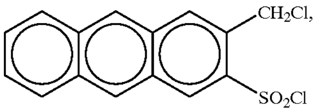

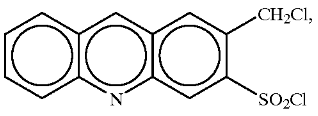

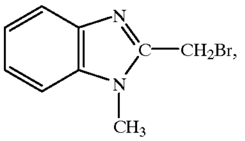

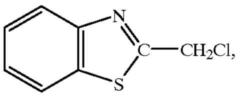

-continued

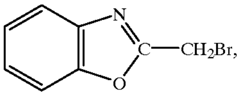

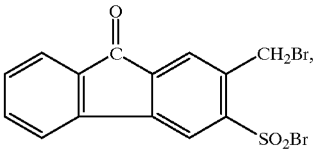

Examples of amines include diphenylamine, carbazole, triphenylamine and compounds represented by the following formulas:

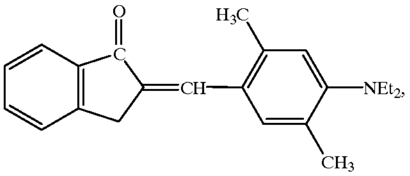

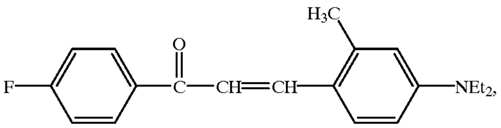

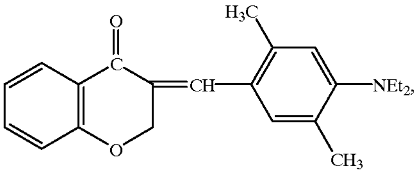

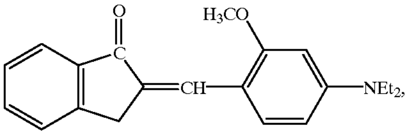

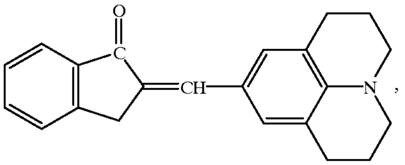

Examples of photosensitizers other than those mentioned above include propiophenone, anthroin, benzaldehyde, butylophenone, 2-naphthylphenylketone, 2-naphthalidehyde, 2-acetonaphthone, 1-naphthylphenylketone, 1-acetonaphthone, 1-naphthaldehyde, fluorenone, 1-phenyl-1,2-propanedione, benznitrile, acetone, biacetyl, acridine orange, acridine, Rhodamine B, eosin, fluorescein, compounds represented by the following formulas:

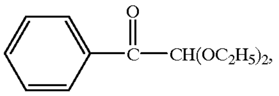

-continued

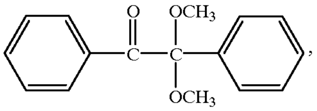

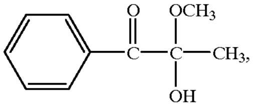

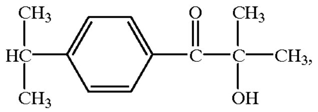

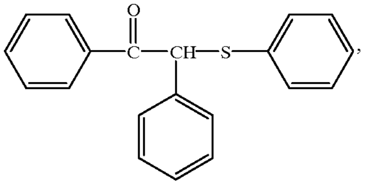

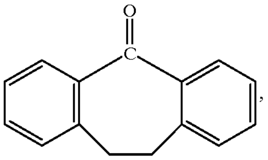

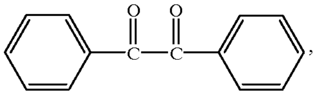

These photosensitizers can be used singly or in the form of mixture of two or more types and the content thereof is generally 0.001 to 10 wt %, and preferably 0.01 to 5 wt % based on the amount of the epoxy resin.

If the content of the photosensitizer is less than 0.001 wt %, the addition effect of the photosensitizer will not be fully obtained. On the other hand, if the content exceeds 10 wt %, a mechanical strength of the cured products tends to decrease.

When the epoxy resin composition of the present invention contains a compound promoting a curing reaction by light radiation, such as the compound generating acid or an acidic substance by light radiation or a photosensitizer, it is necessary to radiate light when the resin composition is cured. A wavelength of light varies depending on compounds to be contained and formulation of a composition and generally in the range of 180 to 700 nm, in which an ultraviolet ray is particularly efficient.

As the light source, any light source can be used as long as it is generally used for photo-setting. Examples of the light source include a low-pressure mercury lamp, high-pressure mercury lamp, carbon arc lamp, metal halogen lamp, xenon-mercury lamp, xenon lamp, hydrogen discharge tube, tungsten lamp, halogen lamp, sodium discharge tube, neon discharge tube, argon discharge tube, He-Ne laser, Ar ion laser, $N_2$ laser, Cd ion laser, He-Cd laser and dye laser. One or more light source selected from the aforementioned light sources can be used when a resin is cured. The curing catalyst of the present invention can be generally activated at a temperature of 100 to 250° C. Accordingly, the curing of the epoxy resin composition of the present invention containing this curing catalyst is performed in the aforementioned temperature range for several minutes to several hours.

EXAMPLES

EXAMPLES 1 to 24

Epoxy resin compositions having the formulations set forth in the following Table 1 were prepared by mixing individual components in an amounts listed in Table 1. The mixing amount shown in the following tables is expressed in the unit of parts by weight. The compositions thus obtained were individually determined for curing time at 200° C., stability-in-storage at room temperature, mechanical strength and electrical insulating characteristics after curing. As the stability-in-storage at room temperature herein, a period of time during which the viscosity of the composition doubles, was determined. As the mechanical strength after curing, flexural strength at room temperature was measured. The measurement of the volume resistivity and flexural strength were performed using cured products obtained by 2 hour curing at 200° C. in Examples 1 to 12, and using cured products obtained by 20 minutes curing at 200° C. in Examples 13 to 24. The results are shown in Table 2 below.

It should be noted that individual components indicated by abbreviated designations are detailed below:

EP1: EPICOAT 828, a trade name of epibis-type epoxy rein manufactured by Shell Chemical having an epoxy equivalent of 190–210

EP2: CELOXIDE 2021, a trade name of alicyclic epoxy resin manufactured by Daicel Chemical Industries Ltd., having an epoxy equivalent of 145

OH1

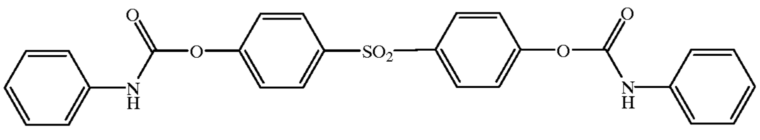

OH2

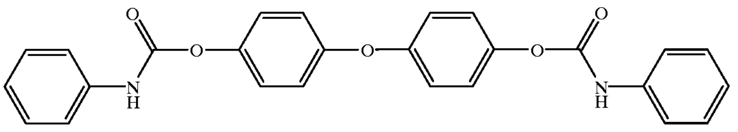

-continued

OH5

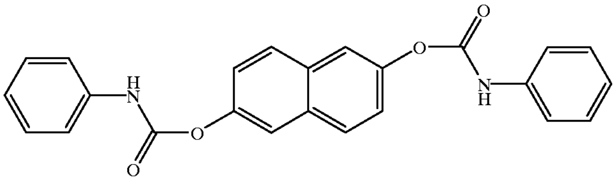

Al1: Al-acetylacetone complex
Al2: Al-ethylacetoacetate complex
Al3: Al-salicylaldehyde complex

TABLE 1

| Examples | Epoxy resin | | Compound (I), (II) or (III) | | | | | Al Complex | | |
|---|---|---|---|---|---|---|---|---|---|---|
| No. | EP1 | EP2 | OH1 | OH2 | OH3 | OH4 | OH5 | A11 | A12 | A13 |
| 1 | 100 | | 5 | | | | | 2 | | |
| 2 | 100 | | 5 | | | | | | 2 | |
| 3 | 100 | | 5 | | | | | | | 2 |
| 4 | 100 | | | 9 | | | | 2 | | |
| 5 | 100 | | | 9 | | | | | 2 | |
| 6 | 100 | | | 9 | | | | | | 2 |
| 7 | 100 | | | | 5 | | | 2 | | |
| 8 | 100 | | | | 5 | | | | 2 | |
| 9 | 100 | | | | 5 | | | | | 2 |
| 10 | 100 | | | | | 2 | | 2 | | |
| 11 | 100 | | | | | 2 | | | 2 | |
| 12 | 100 | | | | | 2 | | | | 2 |
| 13 | | 100 | 3 | | | | | 1 | | |
| 14 | | 100 | 3 | | | | | | 1 | |
| 15 | | 100 | 3 | | | | | | | 1 |
| 16 | | 100 | | 6 | | | | 1 | | |
| 17 | | 100 | | 6 | | | | | 1 | |
| 18 | | 100 | | 6 | | | | | | 1 |
| 19 | | 100 | | | 4 | | | 1 | | |
| 20 | | 100 | | | 4 | | | | 1 | |
| 21 | | 100 | | | 4 | | | | | 1 |
| 22 | | 100 | | | | 2 | | 1 | | |
| 23 | | 100 | | | | 2 | | | 1 | |
| 24 | | 100 | | | | | 3 | | | 1 |

TABLE 2

| Examples No. | Geletinization time at 200° C. (Second) | Stability on strage (Time) | Volume resistivity Ω · cm (200° C.) | Flexural strength kg/mm² (room temperature) |
|---|---|---|---|---|
| 1 | 60 | at least 3 months | $2 \times 10^{13}$ | 13 |
| 2 | 53 | at least 3 months | $3 \times 10^{13}$ | 14 |
| 3 | 35 | at least 3 months | $6 \times 10^{13}$ | 14 |
| 4 | 62 | at least 3 months | $2 \times 10^{12}$ | 12 |
| 5 | 44 | at least 3 months | $2 \times 10^{12}$ | 13 |
| 6 | 23 | at least 3 months | $6 \times 10^{12}$ | 13 |
| 7 | 67 | at least 3 months | $2 \times 10^{13}$ | 14 |
| 8 | 50 | at least 3 months | $1 \times 10^{13}$ | 14 |

TABLE 2-continued

| Examples No. | Geletinization time at 200° C. (Second) | Stability on strage (Time) | Volume resistivity Ω · cm (200° C.) | Flexural strength kg/mm² (room temperature) |
|---|---|---|---|---|
| 9 | 33 | at least 3 months | $4 \times 10^{13}$ | 12 |
| 10 | 52 | at least 3 months | $2 \times 10^{13}$ | 13 |
| 11 | 50 | at least 3 months | $6 \times 10^{13}$ | 12 |
| 12 | 27 | at least 3 months | $8 \times 10^{13}$ | 12 |
| 13 | 20 | at least 3 months | $5 \times 10^{13}$ | 15 |
| 14 | 18 | at least 3 months | $5 \times 10^{13}$ | 14 |
| 15 | 7 | at least 3 months | $6 \times 10^{13}$ | 15 |
| 16 | 32 | at least 3 months | $4 \times 10^{13}$ | 14 |
| 17 | 23 | at least 3 months | $5 \times 10^{13}$ | 15 |

TABLE 2-continued

| Examples No. | Geletinization time at 200° C. (Second) | Stability on strage (Time) | Volume resistivity Ω · cm (200° C.) | Flexural strength kg/mm$^2$ (room temperature) |
|---|---|---|---|---|
| 18 | 8 | at least 3 months | $6 \times 10^{13}$ | 16 |
| 19 | 29 | at least 3 months | $7 \times 10^{13}$ | 15 |
| 20 | 21 | at least 3 months | $9 \times 10^{13}$ | 12 |
| 21 | 8 | at least 3 months | $8 \times 10^{13}$ | 14 |
| 22 | 22 | at least 3 months | $7 \times 10^{13}$ | 16 |
| 23 | 11 | at least 3 months | $6 \times 10^{13}$ | 14 |
| 24 | 6 | at least 3 months | $8 \times 10^{13}$ | 15 |

Comparative Examples 1 to 3

Epoxy resin compositions having the formulations set forth in the following Table 3 were prepared by mixing individual components in an amount listed in Table 3. That is, a compound having a phenolic hydroxyl group not protected with a protecting group was used herein as a compound represented by the formula (I), (II) or (III). The compositions thus obtained were individually determined for curing time at 200° C., and stability-in-storage at room temperature in the same manner as in Examples 1 to 24. The results are shown in the following Table 4.

OH01

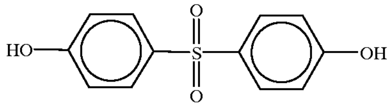

OH02

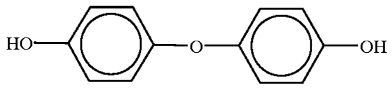

OH03

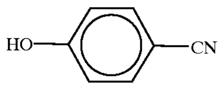

TABLE 3

| Comparative Examples | Epoxy resin | Compound (I), (II) or (III) | | | Al complex | | |
|---|---|---|---|---|---|---|---|
| No. | EP1 | OH01 | OH02 | OH03 | A11 | A12 | A13 |
| 1 | 100 | 4 | | | 2 | | |
| 2 | 100 | | 7 | | | 2 | |
| 3 | 100 | | | 1.5 | | | 2 |

TABLE 4

| Comparative Examples No. | Gelatinization time at 200° C. (Second) | Stability on storage (Day) |
|---|---|---|
| 1 | 69 | 2 days |
| 2 | 42 | 2 days |
| 3 | 18 | 1 day |

As is apparent from Tables 2 and 4, the epoxy resin compositions of the present invention exhibit considerably higher stability-in-storage at room temperature than those of conventional epoxy resin compositions while preserving curing characteristics, that is, rapid curing at high temperature. In addition, they exhibit excellent mechanical strength and electrical insulating characteristics after curing.

EXAMPLE 25

EP1 (100 g), OH1 (5 g), Al3 (2 g), and an acid generator S1 (0.1 g) were mixed to prepare a composition mixture. After the composition mixture was heated at 160° C. for 2 hours, the cured product thus obtained was tested for electrical insulating characteristics and flexural strength.

As a result, the volume resistivity at 200° C. was $2.5\times10^{11}$ ω·cm and the flexural strength at room temperature was 14 kg/mm.

S1

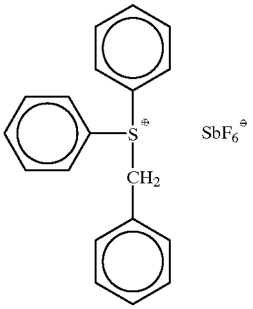

Comparative Example 4

EP1 (100 g) and S1 (0.1 g) were mixed to prepare a composition mixture. Although heated at 160° C. for 2 hours, the composition mixture was not fully cured.

EXAMPLE 26

EP1 (100 g), OH1 (5 g), Al3 (2 g), and an acid generator S2 (0.1 g) were mixed to prepare a composition mixture. The composition mixture was irradiated by light for 30 seconds using a high pressure mercury lamp (80 W/cm) and then heated for 2 hours at 160° C. The cured product thus obtained was tested for electrical insulating characteristics and flexural strength.

As a result, the volume resistivity at 200° C. was $3\times10^{11}$ ω·cm and the flexural strength at room temperature was 14 kg/mm.

S2

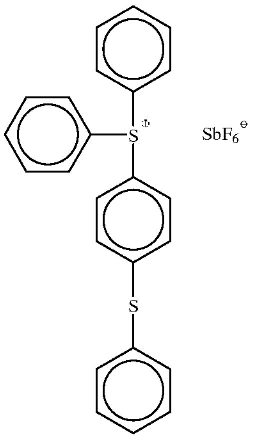

Comparative Example 5

EP1 (100 g) and S2 (0.1 g) were mixed to prepare a composition mixture. Although irradiated by light using a high pressure mercury lamp (80 W/cm) for 30 minutes and then heated at 160° C. for 2 hours, the composition mixture was not fully cured.

EXAMPLE 27

EP1 (100 g), an acid anhydride curing agent AA1 (80 g), OH1 (5 g), and Al3 (2 g) were mixed to prepare a composition mixture. After the composition mixture was heated at 200° C. for 2 hours, the cured product thus obtained was tested for the electrical insulating characteristics and flexural strength.

As a result, the volume resistivity at 200° C. was $9\times10^{11}$ ω·cm and the flexural strength at room temperature was 14 kg/mm.

AA1

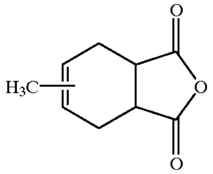

EXAMPLE 28

EP1 (100 g), OH1 (5 g), an aromatic amine curing agent DAM (20 g) and Al3 (2 g) were mixed to prepare a composition mixture. After the composition mixture was heated at 200° C. for 2 hours, the cured product thus obtained was tested for the electrical insulating characteristics and flexural strength.

As a result, the volume resistivity at 200° C. was $9\times10^{11}$ ω·cm and the flexural strength at room temperature was 14 kg/mm.

DAM

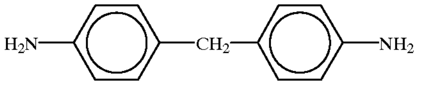

EXAMPLE 29

EP1 (100 g), OH1 (5 g), and Al2 (2 g) were mixed to prepare a composition mixture. The gelling time of the composition mixture at 200° C. was 40 seconds. Even if it was allowed to stand alone at room temperature for 3 months, its viscosity scarcely increased.

Comparative Example 6

EP1 (100 g), diphenyldimethoxysilane (5 g), and Al2 (2g) were mixed to prepare a composition mixture. The gelling time of the composition mixture at 200° C. was 20 seconds. The viscosity of the composition mixture, however, increased double after the composition mixture was allowed to stand alone for 2 months.

EXAMPLES 30 to 34

EP28 (100 g) (an epoxy resin manufactured by Shell Chemical). Tris (ethylacetoacetato) aluminum (1 g), and each (3g) of compounds shown in Table 5 were mixed and dissolved to thereby obtain mixture solutions. Subsequently, each of the mixture solutions was poured into a mold for use in measuring glass transition point (Tg) and cured under three conditions: 100° C. for 30 minutes, 140° C. for one hour, and 160° C. for 5 hours. Thereafter, the glass transition points were measured with respect to individual cured products.

TABLE 5

| Examples | Compound (I), (II) or (III) |
|---|---|
| 30 | 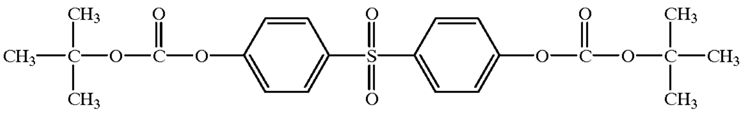 |

TABLE 5-continued

| Examples | Compound (I), (II) or (III) |
|---|---|
| 31 | 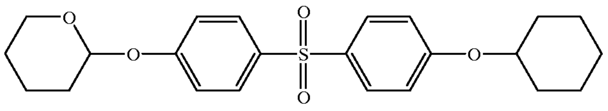 |
| 32 | 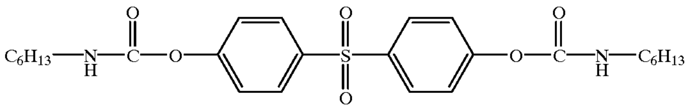 |
| 33 | 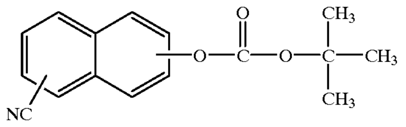 |

As a result, all the cured products thus obtained exhibited the glass transition points (Tg) of 125° C.

Thereafter, the same manner as above was repeated except that the following compound was used instead of the compounds listed in Table 5 and then Tg of the obtained products were measured.

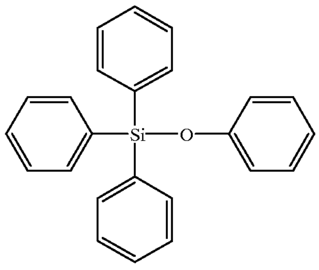

As a result, Tg was 105° C.

As is apparent from the results mentioned above, the use of the curing catalyst of the present invention make it possible to increase Tg of the epoxy resin composition.

EXAMPLE 35

EP807 (100 g) (an epoxy resin manufactured by Shell Chemical), Tris (ethylacetoacetato) aluminum (1 g), and the compound (3 g) having a structure shown below were mixed and dissolved to thereby obtain a mixture solution. Subsequently, the mixture solution was poured into a mold of 1 mm in thickness and cured under three conditions: 100° C. for 30 minutes, 160° C. for 30 minutes and 180° C. for 5 hours. Thereafter, the glass transition points (Tg) were measured with respect to the cured products thus obtained.

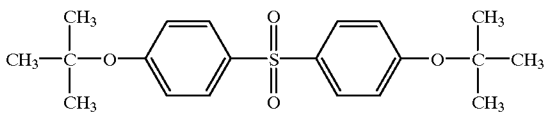

As a result, Tg was 115° C.

Thereafter, the same manner as above was repeated except that the compound used in Example 31 instead of the compound represented by the aforementioned formula, and then Tg of the obtained products were measured. As a result, Tg was 115° C. In these compositions, even if stored at room temperature for 6 months, there was no increase in viscosity.

EXAMPLE 36

EP1 (80g), EP2 (20g). Tris (ethylacetoacetato) aluminum (1 g), and a compound (3 g) used in Example 32 (refer to Table 5) were mixed, dissolved, and poured into a mold for Tg measurement. The mixture was cured at 120° C. for 5 hours to prepare cured resin plates. In contrast, epoxy resin compositions, which were prepared in the same manner as above except that the compounds used in Examples 30 and 31 (refer to Table 5) were used instead of the compound used in Example 32, were not fully cured in the same conditions as above. Further, when the three compositions were stored for one month at room temperature, there was no increase of viscosity in any one of the compositions.

From the results, it is clear that the epoxy resin composition containing a curing catalyst having a compound represented by formula (III) can be cured at lower temperature.

EXAMPLES 37

EP1 (80 g), EP2 (20 g). Tris (ethylacetoacetato) aluminum (1 g), and the compound (3 g) used in Example 30 (refer to Table 5) were mixed, dissolved and poured into a mold for Tg measurement. The mixture was cured at 170° C. for 5 hours to prepare cured resin plates. The cured plate thus obtained had micro-pores. The dielectric constant of the plate measured was 2.2.

On the other hand, the resin plate, which was prepared by pouring the mixture into a mold, allowing to stand alone at 140° C. for one hour and curing at 160° C., had no micro-pores inside the plate and its dielectric constant was 3.5.

What is claimed is:

1. An epoxy resin composition comprising an epoxy resin and a curing catalyst containing at least one compound selected from the group consisting of compounds represented by the following formulas (I), (II) and (III) and at least one aluminum compound, (I)

(II)

(III)

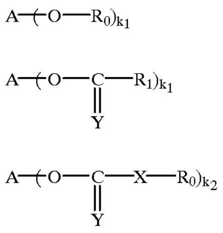

wherein A is a substituted or unsubstituted aromatic group or a heteroaromatic group; $R_1$ may be the same or different and is a substituted or unsubstituted hydrocarbon group having 1 to 20 carbon atoms; $R_0$ may be the same or different and is a substituted methyl group, 1-substituted ethyl group, 1-branched alkyl group, alkoxycarbonyl group, acyl group, cyclopropyl, cylopentyl, cyclohexyl, cyclohexenyl, 4-methoxycyclohexyl, tetrahydropranyl, tetrahydrofuranyl, tetrahydrotbiopyranyl, tetrahydrothiofuranyl, 3-bromotetrahydropyrayl, 4-methoxytetrahydropyranyl 4-methoxytetahydrothiopranyl, S-S-dioxide, 2-1,3-dioxolanyl, 2-1,3-dithioxolanyl, benzo-2-1,3-dioxolanyl, and benzo-2-1,3-ditbioxolanyl groups [or alicyclic leaving group that acts as a protecting group for a phenolic hydroxyl group and is eliminated by reaction with acid]; X is O or HN; Y is O or S; $k_1$ is an integer from 1 to 10; and $k_2$ is an integer from 2 to 10; with the proviso that the following compound is excluded from formula (III):

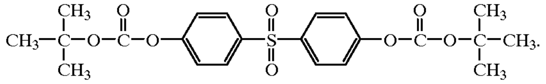

2. The epoxy resin composition according to claim 1, wherein said at least one compound selected from the group consisting of compounds represented by the following formulas (I), (II) and (III) is contained in an amount of 0.1 to 50 wt % based on the amount of said epoxy resin.

3. The epoxy resin composition according to claim 1, wherein said aluminum compound is contained in an amount of 0.1 to 5 wt % based on the amount of the epoxy resin.

4. The epoxy resin composition according to claim 1, wherein $R_1$ of the compound represented by formula (II) is a group selected from the group consisting of a substituted methyl group, an 1-substituted ethyl group, an 1-branched alkyl group, an alkoxycarbonyl group, an acyl group, cyclopropyl cyclopentyl, cyclohexyl, cyclohexenyl, 4-methoxycyclohexyl, tetrahydropyranyl, tetrahydrofuranyl, tetrahydrothiopyranyl, tetrahydrothiouranyly 3-bromotetrahydropyranyl, 4-methoxtetrahydropyranyl, methoxyletrahydrothiopyranyl, S,S-dioxide, 2-1,3-dioxolanyl, 2-1,3-dilhioxolanyl, benzo-2-1,3-dioxolanyl, and benzo-2-1,3dithioxolanyl groups.

5. The epoxy resin composition according to claim 1, wherein A in said formula (I), (II), or (III) is a group selected from the group consisting of a monocyclic aromatic group, a monocyclic heteroaromatic group, a group formed by condensing 2 or 3 aromatic groups and/or heteroaromatic group, and the aforementioned groups in which hydrogen atoms thereof is substituted with at least one substituent.

6. The epoxy resin composition according to claim 1, wherein said at least one compound selected from the group consisting of compounds represented by the formulas (I), (II), and (III) is a compound represented by formula:

Ph—O—R' wherein Ph is a substituted or unsubstituted phenyl group; and R' is a —C(Me)R"R"' group or pyranyl group in which Me is a methyl group, R" and R"' may be the same or different and represent a substituted or unsubstituted hydrocarbon group having 1 to 12 carbon atoms.

7. The epoxy resin composition according to claim 1, wherein said at least one compound selected from the group consisting of compounds represented by the formulas (I), (II), and (III) is a compound represented by the formula (III).

8. The epoxy resin composition according to claim 7, wherein X and Y in said formula (III) are NH and O, respectively.

9. The epoxy resin composition according to claim 1, wherein said aluminum compound is an organic aluminum compound.

10. The epoxy resin composition according to claim 1, wherein said $R_0$ is selected from the group consisting of methoxymethyl, methylthiomethyl, ethoxymethyl, ethylthiomethyl, methoxyethoxymethyl, benzyloxymethyl, benzylthiomethyl, phenacyl, bromophenacyl, methoxyphenacyl, methylthiophenacyl, α-methylphenacyl, cyclopropylmethyl, benzyl, diphenylmethyl, triphenylmethyl, bromobenzyl, nitrobenzyl, methoxybenzyl, methylthiobenzyl, ethoxybenzyl, ethylthiobenzyl, piperonyl, t-butoxycarbonyl, 1-methoxyethyl, 1-methylthioethyl, 1,1-dimethoxyethyl, 1-ethoxyethyl, 1-ethylthioethyl, 1,1-diethoxyethyl, 1-phenoxyethyl, 1-phenylthioethyl, 1,1-diphenoxyethyl, 1-benzyloxyethyl, 1-benzylthioethyl, 1-cyclopropylethyl, 1-phenylethyl, 1,1-diphenylethyl, isopropyl, sec-butyl, t-butyl, 1,1-dimethylpropyl, 1-methylbutyl, 1,1-dimethylbutyl, methoxycarbonyl, ethoxycarbonyl, isopropoxycarbonyl, t-butoxycarbonyl, acetyl, propionyl, butyryl, heptanoyl, hexanoyl, valeryl, pivaroyl, isovaleryl, lauryloyl, myristoyl, paimitoyl, stearoyl, oxalyl, malonyl, succinyl, glutaryl, azipoyl, piperoyl, suberoyl, azelaoyl, sebacoyl, acryloyl, propioloyl, methacryloyl, crotonoyl, oleoyl, maleoyl, fumaroyl, mesaconoyl, camphoroyl, benzoyl, phthaloyl, isophthaloyl, terephthaloyl, naphthoyl, toluoyl, hydroatropoyl, atoropoyl, cinnamoyl, furoyl, tenoyl, nicotinoyl, isonicotinoyl, p-toluenesulfonyl, mesyl, cyclopropyl, cyclopentyl, cyclohexyl, cyclohexenyl, 4-methoxycyclohexyl, tetrahydropyranyl, tetrahydrofuiranyl, tetrahydrothiopyranyl, tetrahydrohiofuranyl, 3-bromotetrahydropyranyl, 4-methoxytetrahydropyranyl, 4-methoxytetrahydrothiopyranyl, S,S-dioxide, 2-1,3-dioxolanyl, 2-1,3-dithioxolanyl, benzo-2-1,3-dioxolanyl, and benzo-2 1,3-dithioxolanyl.

11. The epoxy resin composition according to claim 1, further comprising an acid generator generating acid by heat application or light irradiation.

12. The epoxy resin composition according to claim 11, wherein said acid generator is selected from the group consisting of an onium salt, orthoquinonediazidosulfonic acid chloride, a sulfonate ester, and an organic halide.

13. The epoxy resin composition according to claim 12, wherein said acid generator is a sulfonium salt or an iodonium salt.

* * * * *